US012719871B2

(12) United States Patent
Mignolet et al.

(10) Patent No.: US 12,719,871 B2
(45) **Date of Patent: *Aug. 25, 2026**

(54) SYSTEMS AND METHODS FOR DATA SEGREGATION AND SECURITY BASED ON ACCESS RIGHTS FOR ADDITIONAL SERVICES

(71) Applicant: MASTERCARD INTERNATIONAL INCORPORATED, Purchase, NY (US)

(72) Inventors: Cathy Mignolet, Wavre (BE); Peter Groarke, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 18/667,911

(22) Filed: May 17, 2024

(65) Prior Publication Data

US 2025/0358286 A1 Nov. 20, 2025

(51) Int. Cl.

*H04L 9/40* (2022.01)
*G06F 9/50* (2006.01)

(Continued)

(52) U.S. Cl.

CPC .............. *H04L 63/10* (2013.01); *G06F 9/505* (2013.01); *G06F 21/6245* (2013.01);

(Continued)

(58) Field of Classification Search

None

See application file for complete search history.

(56) References Cited

U.S. PATENT DOCUMENTS

| | | | | |
|---|---|---|---|---|
| 5,625,791 | A | 4/1997 | Farrugia et al. | |
| 7,424,538 | B2 * | 9/2008 | Igarashi | H04L 69/329 455/433 |

(Continued)

FOREIGN PATENT DOCUMENTS

| | | | |
|---|---|---|---|
| CN | 111367993 | A | 7/2020 |
| CN | 116661837 | A | 8/2023 |
| CN | 117994032 | A | 5/2024 |

OTHER PUBLICATIONS

Ranchal et al "EPICS: A Framework for Enforcing Security Policies in Composite Web Services," IEEE, pp. 415-428 (Year: 2019).*

(Continued)

*Primary Examiner* — Luu T Pham
*Assistant Examiner* — James J Wilcox
(74) *Attorney, Agent, or Firm* — Armstrong Teasdale LLP

(57) ABSTRACT

A scalable orchestration framework including an orchestrator platform is disclosed. The orchestration platform is configured to: (i) in response to receiving a first request data message, identify a total number of services of a plurality of value-added services to be invoked at a respective plurality of value-added services platforms; (ii) determine permissioned data elements of a plurality of data elements of the first request data message to be provided to each of the invoked value-added services; (iii) instantiate a service execution layer corresponding to each service of the plurality of services; (iv) provision each instantiated service execution layer with the permissioned data elements for the corresponding service of the plurality of invoked services; and (v) generate and transmit, to the requestor computing device, a first response data message based upon a received service response message from each instantiated service execution layer.

16 Claims, 14 Drawing Sheets

(51) Int. Cl.
*G06F 21/62* (2013.01)
*G06Q 20/02* (2012.01)
*G06Q 20/40* (2012.01)
*H04L 67/51* (2022.01)
*H04L 67/56* (2022.01)

(52) U.S. Cl.
CPC ............ *G06Q 20/02* (2013.01); *G06Q 20/40* (2013.01); *H04L 67/51* (2022.05); *H04L 67/56* (2022.05)

(56) References Cited

U.S. PATENT DOCUMENTS 7,590,624 B2 9/2009 Shipley et al.
8,781,104 B1 * 7/2014 Allen .................. H04L 12/1403 379/265.09
8,935,797 B1 * 1/2015 Silver ................ G06F 21/6254 726/26
10,085,119 B2 * 9/2018 Jeong .................... H04L 67/563
10,129,722 B2 * 11/2018 Fu ........................... H04L 67/53
10,164,944 B1 * 12/2018 Felstaine .............. H04L 63/083
10,416,966 B2 * 9/2019 Barday ..................... G06F 8/20
10,417,450 B2 * 9/2019 Barday ................ G06F 9/4881
10,430,740 B2 * 10/2019 Barday ................ G06F 21/552
10,437,412 B2 * 10/2019 Barday ................ G06F 3/0481
10,438,016 B2 * 10/2019 Barday .............. G06F 16/1727
10,438,017 B2 * 10/2019 Barday .................. H04L 67/52
10,445,526 B2 * 10/2019 Barday .............. G06F 21/6245
10,452,864 B2 * 10/2019 Barday ................ G06F 40/174
10,452,868 B1 * 10/2019 Sundberg ............... G06F 21/71
10,454,973 B2 * 10/2019 Barday ................. G06N 20/00
10,467,432 B2 * 11/2019 Barday ................ G06F 21/552
10,496,803 B2 * 12/2019 Barday .............. G06F 21/6245
10,496,846 B1 * 12/2019 Barday ..................... G06F 8/20
10,503,926 B2 * 12/2019 Barday .............. G06F 21/6245
10,509,894 B2 * 12/2019 Brannon ............ G06F 21/6245
10,509,920 B2 * 12/2019 Barday ................ G06F 16/113
10,510,031 B2 * 12/2019 Barday ................ G06F 21/552
10,552,639 B1 * 2/2020 Buzbee .............. G06F 21/6245
10,558,821 B2 * 2/2020 Barday ................ H04L 63/108
10,558,824 B1 * 2/2020 Remington ............ H04L 67/02
10,564,935 B2 * 2/2020 Barday .................. H04L 63/20
10,565,161 B2 * 2/2020 Barday .............. G06F 21/6245
10,565,397 B1 * 2/2020 Barday .............. G06F 21/6245
10,592,648 B2 * 3/2020 Barday .............. G06F 11/3438
10,592,692 B2 * 3/2020 Brannon ............ G06F 21/6245
10,599,870 B2 * 3/2020 Barday ................ G06F 21/606
10,606,916 B2 * 3/2020 Brannon .............. G06F 16/215
10,607,028 B2 * 3/2020 Brannon ............ G06F 21/6245
10,614,246 B2 * 4/2020 Barday ................ H04L 63/108
10,614,247 B2 * 4/2020 Brannon .............. G06F 16/215
10,642,870 B2 * 5/2020 Malhotra ............ G06Q 50/265
10,678,945 B2 * 6/2020 Barday .............. G06F 21/6245
10,685,140 B2 * 6/2020 Barday ................ G06F 21/604
10,706,131 B2 * 7/2020 Barday ................ G06F 21/316
10,706,174 B2 * 7/2020 Barday .................. G06F 15/76
10,706,379 B2 * 7/2020 Brannon ........... G06Q 10/0635
10,708,305 B2 * 7/2020 Barday ................ H04L 63/126
10,713,387 B2 * 7/2020 Brannon .............. H04L 67/146
10,726,158 B2 * 7/2020 Brannon ............ G06F 21/6245
10,740,487 B2 * 8/2020 Barday .................. G06F 16/22
10,762,236 B2 * 9/2020 Brannon ............ G06F 16/2379
10,769,301 B2 * 9/2020 Barday .............. G06F 21/6245
10,776,514 B2 * 9/2020 Barday .................. H04L 63/20
10,783,256 B2 * 9/2020 Brannon .............. G06F 21/606
10,789,461 B1 9/2020 Agrawal et al.
10,796,260 B2 * 10/2020 Brannon .............. G06F 21/577
10,798,133 B2 * 10/2020 Barday .............. H04L 41/0856
10,803,200 B2 * 10/2020 Barday .............. G06F 16/1734
10,803,202 B2 * 10/2020 Brannon ............ G06F 21/6245
10,812,341 B1 * 10/2020 Campello De Souza .................. H04L 41/22
10,839,102 B2 * 11/2020 Barday .............. G06F 11/3409
10,846,433 B2 * 11/2020 Brannon .............. G06F 21/602
10,848,523 B2 * 11/2020 Brannon .............. G06F 16/904
10,853,501 B2 * 12/2020 Brannon ............ G06F 21/6263
10,853,509 B2 12/2020 Alagar et al.
10,860,622 B1 * 12/2020 Florissi .................. G06F 16/22
10,873,606 B2 * 12/2020 Brannon .............. G06F 21/577
10,878,127 B2 * 12/2020 Brannon ................ G06F 21/33
10,885,485 B2 * 1/2021 Brannon ............. G06Q 10/067
10,896,394 B2 * 1/2021 Brannon .............. G06F 21/552
10,909,265 B2 * 2/2021 Jones .................... G06F 16/901
10,909,488 B2 * 2/2021 Hecht ............... G06Q 10/0635
10,918,953 B1 * 2/2021 Pickens ................ H04W 48/02
10,922,547 B1 * 2/2021 Siminoff ............. H04N 23/661
10,944,725 B2 * 3/2021 Gunasingam ......... G06F 16/214
10,949,170 B2 * 3/2021 Barday .............. G06F 21/6245
10,949,565 B2 * 3/2021 Barday .............. G06F 16/2457
10,970,675 B2 * 4/2021 Barday ................ H04L 67/306
10,997,315 B2 * 5/2021 Barday ............. G06Q 30/0203
11,023,842 B2 * 6/2021 Beaumont .............. G06F 15/76
11,036,674 B2 * 6/2021 Barday ................ G06F 21/577
11,036,882 B2 * 6/2021 Barday ................ G06F 16/113
11,038,925 B2 * 6/2021 Brannon .............. G06F 21/577
11,074,367 B2 * 7/2021 Brannon ............... G06Q 50/18
11,087,260 B2 * 8/2021 Clearwater .......... G06F 21/552
11,100,444 B2 * 8/2021 Brannon ............. G06Q 30/018
11,122,011 B2 * 9/2021 Gunasingam .......... H04L 63/20
11,122,079 B1 * 9/2021 Aloisio .............. H04L 63/0407
11,134,086 B2 * 9/2021 Brannon .............. H04L 63/102
11,138,242 B2 * 10/2021 Malhotra ........... G06F 21/6245
11,138,299 B2 * 10/2021 Brannon .............. G06F 21/577
11,144,622 B2 * 10/2021 Brannon ............ G06F 21/6245
11,144,675 B2 * 10/2021 Brannon ............ G06F 21/6263
11,146,566 B2 * 10/2021 Barday .................. H04L 63/08
11,151,233 B2 * 10/2021 Brannon ............ G06F 21/6245
11,157,600 B2 * 10/2021 Brannon ............ G06F 11/3438
11,188,615 B2 * 11/2021 Brannon .............. G06F 16/215
11,188,862 B2 * 11/2021 Brannon ............. G06Q 10/067
11,200,341 B2 * 12/2021 Barday ................ G06F 16/901
11,210,420 B2 * 12/2021 Brannon ............ G06F 21/6245
11,222,139 B2 * 1/2022 Jones .................... G06F 16/901
11,222,142 B2 * 1/2022 Jones ...................... G06F 21/60
11,222,309 B2 * 1/2022 Barday ................ H04L 67/535
11,227,247 B2 * 1/2022 Beaumont .............. G06F 15/76
11,228,620 B2 * 1/2022 Brannon ................ G06F 15/76
11,233,772 B1 * 1/2022 Dinan ................ G06F 21/6245
11,238,390 B2 * 2/2022 Brannon ............ G06F 21/6245
11,277,448 B2 * 3/2022 Brannon .............. H04L 41/145
11,294,939 B2 * 4/2022 Malhotra ................ H04L 63/04
11,295,316 B2 * 4/2022 Brannon ............. G06Q 50/265
11,301,796 B2 * 4/2022 Clearwater .......... G06F 21/577
11,328,092 B2 * 5/2022 Barday ................ G06F 21/604
11,336,697 B2 * 5/2022 Brannon ............ G06F 21/6245
11,341,447 B2 * 5/2022 Brannon .............. G06F 21/552
11,354,434 B2 * 6/2022 Brannon ................ G06F 9/451
11,354,435 B2 * 6/2022 Brannon .............. H04L 63/102
11,366,786 B2 * 6/2022 Barday ................ G06F 21/577
11,366,909 B2 * 6/2022 Brannon ................ G06F 21/60
11,397,819 B2 * 7/2022 Brannon .............. G06F 21/577
11,403,377 B2 * 8/2022 Brannon ............ G06F 11/3438
11,410,106 B2 * 8/2022 Brannon .............. G06F 21/577
11,416,589 B2 * 8/2022 Brannon ............ G06F 11/3438
11,416,590 B2 * 8/2022 Brannon .............. G06F 21/316
11,416,798 B2 * 8/2022 Brannon .............. G06F 21/577
11,418,492 B2 * 8/2022 Gunasingam ....... G06F 21/6245
11,438,386 B2 * 9/2022 Brannon ................ G06F 15/76
11,475,136 B2 * 10/2022 Brannon .............. G06F 21/577
11,481,710 B2 * 10/2022 Brannon ........... G06Q 10/0635
11,483,293 B1 * 10/2022 Spain .................... H04L 63/029
11,507,947 B1 * 11/2022 McMahon ............ G06Q 20/10
11,520,928 B2 * 12/2022 Brannon ............ G06F 21/6245
11,526,624 B2 * 12/2022 Brannon ............ H04L 63/0227
11,526,859 B1 * 12/2022 Cousins ................ G06Q 20/02
11,544,409 B2 * 1/2023 Brannon ............ G06F 21/6245
11,544,667 B2 * 1/2023 Barday ................ H04L 67/535
11,562,097 B2 * 1/2023 Brannon .............. G06F 16/955
11,622,016 B2 * 4/2023 Smith ..................... H04L 67/53 709/220
11,625,502 B2 * 4/2023 Barday ................ G06F 21/552 726/27
11,636,171 B2 * 4/2023 Brannon .............. G06F 16/951 715/234

(56) References Cited

U.S. PATENT DOCUMENTS 11,650,749 B1 * 5/2023 Tran ........................ G06F 3/067 711/165
11,651,104 B2 * 5/2023 Barday .................. G06F 11/34 717/101
11,651,106 B2 * 5/2023 Barday ................. H04L 63/107 717/101
11,675,929 B2 * 6/2023 Brannon ............. G06F 21/6263 726/30
11,714,683 B1 * 8/2023 Roberts ................. G06F 9/5027 709/223
11,727,141 B2 * 8/2023 Brannon ............. G06F 21/6245 717/101
11,755,679 B2 * 9/2023 Wu ...................... G06F 16/972 709/203
11,818,115 B1 * 11/2023 Shah ....................... H04L 63/20
11,899,824 B1 * 2/2024 Hall .................... G06F 21/6227
11,900,368 B2 * 2/2024 Madisetti ........... G06Q 20/3829
12,052,289 B2 * 7/2024 Brannon ............... G06F 16/904
12,099,635 B1 * 9/2024 Zwiegincew ......... G06F 21/629
12,118,121 B2 * 10/2024 Brannon ............. G06F 21/6245
12,136,055 B2 * 11/2024 Barday .............. G06F 21/6245
12,223,259 B1 * 2/2025 Sembium Varadarajan ................ G06F 21/6254
12,248,599 B1 * 3/2025 Yu ....................... G06F 21/6245
12,299,065 B2 * 5/2025 Jones .................... G06F 40/186
12,314,430 B1 * 5/2025 Hardt .................. G06F 21/6245
12,373,600 B1 * 7/2025 Crabtree ............ G06F 21/6245
12,430,464 B2 * 9/2025 Crume ................ G06F 21/6245
12,455,980 B2 * 10/2025 Cuomo ............... G06F 16/3335
2002/0052915 A1 * 5/2002 Amin-Salehi ...... H04Q 11/0407 709/203
2002/0071423 A1 * 6/2002 Mirashrafi .............. H04M 3/51 370/352
2003/0061365 A1 * 3/2003 White ................. G06F 21/6245 709/229
2003/0065799 A1 * 4/2003 Kitamura ............. H04B 7/0604 709/230
2005/0027871 A1 * 2/2005 Bradley .................. H04L 67/51 709/227
2009/0077169 A1 * 3/2009 Ikeura ..................... H04L 67/51 709/203
2009/0080408 A1 * 3/2009 Natoli ................... G06F 16/258 370/351
2009/0119213 A1 * 5/2009 Hammad ............... G07B 15/02 705/44
2010/0005513 A1 * 1/2010 Bradley .............. H04L 63/0281 718/1
2011/0093618 A1 * 4/2011 Tso ..................... H04L 63/0281 709/246
2011/0225637 A1 * 9/2011 Counterman ....... G06F 21/6245 726/8
2012/0158813 A1 * 6/2012 Kumar .................. G06F 9/5055 709/201
2012/0185913 A1 * 7/2012 Martinez ............. G06F 9/45558 726/1
2013/0125219 A1 * 5/2013 Raleigh ................. H04W 12/08 726/5
2013/0152174 A1 * 6/2013 Raley ...................... H04L 63/10 726/4
2013/0227429 A1 8/2013 Sivadas
2013/0231043 A1 * 9/2013 Tawfiq Moshtaha ........................ G06F 16/2358 455/3.01
2013/0268437 A1 * 10/2013 Desai ................. G06Q 20/3674 705/41
2014/0006626 A1 * 1/2014 Breiter ................ H04L 41/0806 709/226
2014/0020068 A1 * 1/2014 Desai ................. G06Q 20/3227 726/4
2014/0304158 A1 * 10/2014 Basu .................. G06Q 20/4016 705/44
2014/0325587 A1 * 10/2014 Nilsson .................. G16B 50/30 726/1
2015/0234701 A1 * 8/2015 Irani ................... G06F 11/0748 714/15
2015/0302398 A1 * 10/2015 Desai .................. G06Q 20/322 705/41
2015/0317490 A1 * 11/2015 Carey .................... G16B 20/00 726/26
2015/0319176 A1 * 11/2015 Yahalom ................ G06F 16/95 726/3
2015/0379303 A1 * 12/2015 LaFever ............. G06F 21/6254 726/28
2015/0381624 A1 * 12/2015 Reiter ................ G06F 21/6245 713/168
2016/0004882 A1 * 1/2016 Ballai ................ G06F 21/6245 726/30
2016/0087970 A1 * 3/2016 Kahol ..................... H04L 67/56 726/8
2016/0092696 A1 * 3/2016 Guglani ................ G06F 21/606 726/26
2016/0119379 A1 * 4/2016 Nadkarni ............ H04L 63/0263 726/1
2016/0283745 A1 * 9/2016 LaFever ............. G06F 21/6218
2016/0316016 A1 * 10/2016 Arenas .................. G06F 9/5055
2017/0017805 A1 * 1/2017 Carey .................... G16B 50/00
2017/0039214 A1 2/2017 Cen
2017/0126730 A1 * 5/2017 Oberheide .......... H04L 63/1483
2017/0173262 A1 * 6/2017 Veltz ...................... G16H 20/17
2017/0193172 A1 * 7/2017 Melle ..................... G16H 10/60
2017/0208464 A1 * 7/2017 Guertler ................ G06Q 20/02
2017/0243028 A1 * 8/2017 LaFever ............. G06F 21/6254
2017/0344754 A1 * 11/2017 Kumar ................ H04M 3/5175
2018/0060871 A1 * 3/2018 Petrovykh ........... G06F 21/6245
2018/0063134 A1 * 3/2018 Petrovykh ........... G06F 21/6245
2018/0129955 A1 * 5/2018 Saxena .................. G06N 20/00
2018/0129956 A1 * 5/2018 Saxena .................. G06N 20/00
2018/0165416 A1 * 6/2018 Saxena .................. G16H 50/20
2018/0181720 A1 * 6/2018 Ensey .................... G16H 50/20
2018/0293116 A1 * 10/2018 Segal .................. G06Q 10/103
2018/0295109 A1 * 10/2018 Wang ................. H04L 63/0471
2018/0307859 A1 * 10/2018 LaFever .................. H04L 63/20
2018/0329940 A1 * 11/2018 Tiku ........................ G06F 9/546
2018/0373885 A1 * 12/2018 Arad ..................... G06F 21/629
2019/0014111 A1 * 1/2019 Votaw ................ G06Q 20/3829
2019/0034602 A1 * 1/2019 Votaw ................... H04W 12/06
2019/0034716 A1 * 1/2019 Kamarol .............. G11B 27/031
2019/0045207 A1 * 2/2019 Chen ....................... G06F 21/44
2019/0124118 A1 * 4/2019 Swafford ............... G06F 21/84
2019/0236286 A1 * 8/2019 Scriber ................. G06F 21/602
2019/0268643 A1 * 8/2019 Raley ................. G06Q 20/1235
2019/0281074 A1 * 9/2019 Jin ........................ G06F 21/554
2019/0286839 A1 * 9/2019 Mutha ................... G06F 21/604
2019/0332807 A1 * 10/2019 LaFever .............. H04L 63/0407
2019/0342336 A1 * 11/2019 Finkelstein ......... G06F 21/6245
2019/0349426 A1 * 11/2019 Smith ................... H04L 63/123
2019/0372940 A1 * 12/2019 Mcdougall .......... G06F 21/6254
2019/0379699 A1 * 12/2019 Katragadda ......... H04L 63/1425
2020/0004983 A1 * 1/2020 Chen ..................... H04L 9/0819
2020/0036687 A1 * 1/2020 May .................... H04L 63/0421
2020/0134200 A1 * 4/2020 Williams .............. H04L 9/0827
2020/0175194 A1 * 6/2020 Marathe ................ H04L 9/0866
2020/0184100 A1 * 6/2020 Ong .................... G06F 16/1824
2020/0250372 A1 * 8/2020 Remington ......... G06F 21/6281
2020/0286102 A1 * 9/2020 Raganathan ........... G06Q 40/03
2020/0293680 A1 * 9/2020 Navarro-Dimm .......................... H04L 63/0421
2020/0311607 A1 * 10/2020 Mestres ............ G06F 16/90335
2020/0327252 A1 * 10/2020 Mcfall .................... G06F 21/78
2020/0334229 A1 * 10/2020 Harrison .................. A61G 7/05
2020/0334378 A1 * 10/2020 Latka .................... H04L 9/3231
2020/0348662 A1 * 11/2020 Cella .................. G05B 23/0294
2020/0351374 A1 * 11/2020 Eberle ..................... G06F 21/31
2020/0364358 A1 * 11/2020 Karia ................. G06F 21/6218
2020/0374129 A1 * 11/2020 Dilles ................... H04L 9/3273
2020/0389531 A1 * 12/2020 Lee ....................... H04L 67/561
2020/0401677 A1 * 12/2020 Childress .............. H04L 63/108
2020/0402625 A1 * 12/2020 Aravamudan ...... G06F 21/6245
2021/0012282 A1 * 1/2021 Smith ....................... H04L 9/50

(56) References Cited

U.S. PATENT DOCUMENTS

| | | | | |
|---|---|---|---|---|
| 2021/0014282 | A1* | 1/2021 | Anctil | H04L 67/55 |
| 2021/0026982 | A1* | 1/2021 | Amarendran | G06F 21/6254 |
| 2021/0035041 | A1* | 2/2021 | Koch | G06Q 10/06316 |
| 2021/0056227 | A1* | 2/2021 | Xu | G06F 21/64 |
| 2021/0064742 | A1* | 3/2021 | Panigrahi | G06F 9/547 |
| 2021/0064776 | A1* | 3/2021 | Panigrahi | G06F 21/57 |
| 2021/0073393 | A1* | 3/2021 | Jacobson | G06N 3/08 |
| 2021/0081358 | A1* | 3/2021 | Khurana | G06F 16/162 |
| 2021/0081561 | A1* | 3/2021 | Blandin | G06F 21/6245 |
| 2021/0117249 | A1* | 4/2021 | Doshi | G06F 9/5077 |
| 2021/0124843 | A1* | 4/2021 | Vass | G06Q 30/0255 |
| 2021/0150037 | A1* | 5/2021 | Radhakrishnan | G06N 3/08 |
| 2021/0150056 | A1* | 5/2021 | Vax | G06F 16/285 |
| 2021/0157312 | A1* | 5/2021 | Cella | G06Q 30/06 |
| 2021/0192063 | A1* | 6/2021 | Goldstone | G06F 21/6245 |
| 2021/0209202 | A1* | 7/2021 | Dande | H04L 63/08 |
| 2021/0232703 | A1* | 7/2021 | Ivkushkin | G06F 21/6245 |
| 2021/0241241 | A1* | 8/2021 | Lokanath | G06Q 20/065 |
| 2021/0248268 | A1* | 8/2021 | Ardhanari | G06N 20/00 |
| 2021/0342836 | A1* | 11/2021 | Cella | G06N 20/00 |
| 2021/0352142 | A1* | 11/2021 | Jayaram | G06Q 20/26 |
| 2021/0358032 | A1* | 11/2021 | Cella | G06Q 30/0208 |
| 2021/0385268 | A1* | 12/2021 | Cirillo | G06F 9/5072 |
| 2021/0397681 | A1* | 12/2021 | Boule | G06F 21/31 |
| 2021/0406397 | A1* | 12/2021 | Brazeau | G06F 21/6245 |
| 2021/0409400 | A1* | 12/2021 | Palanisamy | H04L 63/20 |
| 2022/0012367 | A1* | 1/2022 | Ramanan | G06F 8/41 |
| 2022/0012731 | A1* | 1/2022 | DeRosa-Grund | G06F 16/2365 |
| 2022/0014528 | A1* | 1/2022 | Gambhir | H04L 63/104 |
| 2022/0019672 | A1* | 1/2022 | Hurwitz | G06F 16/285 |
| 2022/0036377 | A1* | 2/2022 | Seibel | G06Q 30/08 |
| 2022/0045841 | A1* | 2/2022 | Keith, Jr. | G06V 40/20 |
| 2022/0050921 | A1* | 2/2022 | LaFever | G16H 10/60 |
| 2022/0067199 | A1* | 3/2022 | Taber | G06F 21/6254 |
| 2022/0067200 | A1* | 3/2022 | Taber | G06F 21/6245 |
| 2022/0075878 | A1* | 3/2022 | Begg | G06N 3/045 |
| 2022/0108213 | A1* | 4/2022 | Cao | G06F 18/214 |
| 2022/0129369 | A1* | 4/2022 | Sharma | G06F 11/3672 |
| 2022/0129556 | A1* | 4/2022 | Chen | G06F 21/74 |
| 2022/0129583 | A1* | 4/2022 | Balasubramanian | G06N 20/00 |
| 2022/0130501 | A1* | 4/2022 | Keith, Jr. | G06V 40/197 |
| 2022/0141041 | A1* | 5/2022 | Parikh | G06F 21/44<br>713/156 |
| 2022/0159064 | A1* | 5/2022 | Barton | H04L 45/126 |
| 2022/0164424 | A1* | 5/2022 | Keith, Jr. | H04L 9/0866 |
| 2022/0164469 | A1* | 5/2022 | Scott | G06F 9/4881 |
| 2022/0164951 | A1* | 5/2022 | Chui | G06F 18/214 |
| 2022/0179978 | A1* | 6/2022 | Stroila | G06F 21/6245 |
| 2022/0188386 | A1* | 6/2022 | Jain | H04L 9/0841 |
| 2022/0188810 | A1* | 6/2022 | Doney | G06Q 20/405 |
| 2022/0191667 | A1 | 6/2022 | Starsinic et al. | |
| 2022/0198053 | A1* | 6/2022 | Madhavan | G06F 21/6245 |
| 2022/0198054 | A1* | 6/2022 | Picos | G06N 5/04 |
| 2022/0207636 | A1* | 6/2022 | Nalluri | G06F 21/6245 |
| 2022/0232038 | A1* | 7/2022 | Kulkarni | G06F 16/116 |
| 2022/0237309 | A1* | 7/2022 | Reineke | G06F 21/6245 |
| 2022/0255969 | A1* | 8/2022 | Cage | H04L 9/50 |
| 2022/0269811 | A1* | 8/2022 | Gummadivalli | G06F 9/54 |
| 2022/0269817 | A1* | 8/2022 | Nalluri | H04L 63/1441 |
| 2022/0270725 | A1* | 8/2022 | DeRosa-Grund | G06F 16/2365 |
| 2022/0272111 | A1* | 8/2022 | Rao | H04L 63/1433 |
| 2022/0291666 | A1* | 9/2022 | Cella | G05B 19/4155 |
| 2022/0292516 | A1* | 9/2022 | Mimassi | G06F 16/285 |
| 2022/0300650 | A1* | 9/2022 | Ekambaram | G06N 3/088 |
| 2022/0309170 | A1* | 9/2022 | Iyer | G06F 21/604 |
| 2022/0321335 | A1* | 10/2022 | Lum | H04L 9/0897 |
| 2022/0343005 | A1* | 10/2022 | Hanna | G06F 21/6245 |
| 2022/0366494 | A1* | 11/2022 | Cella | G06N 3/006 |
| 2022/0391532 | A1* | 12/2022 | Le | G06F 9/45558 |
| 2022/0407861 | A1* | 12/2022 | Beecham | H04L 63/08 |
| 2023/0009067 | A1* | 1/2023 | Caltenco | G16Y 20/40 |
| 2023/0021563 | A1* | 1/2023 | Narayanam | G06F 18/217 |
| 2023/0023723 | A1* | 1/2023 | Delaunay | H04L 63/0227 |
| 2023/0034426 | A1* | 2/2023 | Kati | G06F 16/24573 |
| 2023/0054446 | A1* | 2/2023 | LaFever | G06F 21/6254 |
| 2023/0056783 | A1* | 2/2023 | Kofman | G06F 21/64 |
| 2023/0068788 | A1* | 3/2023 | Thubert | G06F 9/455 |
| 2023/0074003 | A1* | 3/2023 | Trim | G16H 10/60 |
| 2023/0084202 | A1* | 3/2023 | Patil | G16H 30/20<br>726/26 |
| 2023/0098602 | A1* | 3/2023 | Cella | G05B 13/0265<br>700/248 |
| 2023/0105505 | A1* | 4/2023 | Aravamudan | G16H 10/60<br>702/19 |
| 2023/0106024 | A1* | 4/2023 | Keith, Jr. | G16H 40/63<br>726/5 |
| 2023/0136709 | A1* | 5/2023 | Mellor | G06F 16/254<br>707/602 |
| 2023/0173395 | A1* | 6/2023 | Cella | G06N 3/0455<br>463/25 |
| 2023/0177180 | A1* | 6/2023 | Rolle | G06F 21/604<br>726/27 |
| 2023/0177182 | A1* | 6/2023 | Rolle | G06F 21/6245<br>726/30 |
| 2023/0177183 | A1* | 6/2023 | Rolle | G06F 21/6209<br>726/30 |
| 2023/0177194 | A1* | 6/2023 | Rolle | G06F 21/6245<br>726/27 |
| 2023/0177206 | A1* | 6/2023 | Rolle | G06F 16/2365<br>726/31 |
| 2023/0177213 | A1* | 6/2023 | Rolle | G06F 16/113<br>726/1 |
| 2023/0185957 | A1* | 6/2023 | Brown | G06Q 50/01<br>726/26 |
| 2023/0195926 | A1* | 6/2023 | Mehta | G06F 21/6245<br>726/1 |
| 2023/0206329 | A1* | 6/2023 | Cella | G06Q 20/405 |
| 2023/0214511 | A1* | 7/2023 | Golan | G06F 21/6218<br>726/1 |
| 2023/0216947 | A1* | 7/2023 | Bernardi | H04L 67/10<br>713/150 |
| 2023/0223028 | A1* | 7/2023 | Thakkar | G10L 15/30<br>704/270 |
| 2023/0236552 | A1* | 7/2023 | Cella | G05B 13/0265<br>700/119 |
| 2023/0244823 | A1* | 8/2023 | Iyer | G06F 21/6245<br>726/26 |
| 2023/0267229 | A1* | 8/2023 | Shea | G06F 21/6254<br>726/30 |
| 2023/0281109 | A1* | 9/2023 | Taber | G06F 11/3698<br>717/124 |
| 2023/0281527 | A1* | 9/2023 | Cella | G06V 20/17<br>705/7.17 |
| 2023/0290456 | A1* | 9/2023 | Baror | G16H 30/20 |
| 2023/0299843 | A1 | 9/2023 | Boyd et al. | |
| 2023/0315872 | A1* | 10/2023 | Lally | H04L 9/3239<br>726/27 |
| 2023/0318823 | A1* | 10/2023 | Geng | H04L 9/088<br>701/32.6 |
| 2023/0351040 | A1* | 11/2023 | Cullari | G06F 16/27 |
| 2023/0353535 | A1* | 11/2023 | Hockey | G06F 21/6245 |
| 2023/0396602 | A1* | 12/2023 | Wu | H04L 9/3213 |
| 2024/0005026 | A1* | 1/2024 | Finkelstein | G06F 21/6245 |
| 2024/0012911 | A1* | 1/2024 | Yannuzzi | G06F 21/602 |
| 2024/0012921 | A1* | 1/2024 | Yannuzzi | G06F 21/6218 |
| 2024/0012931 | A1* | 1/2024 | Yannuzzi | H04L 63/107 |
| 2024/0045990 | A1* | 2/2024 | Boyer | G06F 21/6245 |
| 2024/0078336 | A1* | 3/2024 | Sansom | G06F 8/77 |
| 2024/0089343 | A1 | 3/2024 | Flynn, IV et al. | |
| 2024/0105171 | A1* | 3/2024 | Chaganti | G06F 21/6245 |
| 2024/0126916 | A1* | 4/2024 | Nguyen | G06F 21/602 |
| 2024/0135031 | A1* | 4/2024 | Healy | G06F 21/6245 |
| 2024/0135033 | A1* | 4/2024 | Mao | G06F 21/604 |
| 2024/0153602 | A1* | 5/2024 | Kukreja | G06F 21/6245 |
| 2024/0160530 | A1* | 5/2024 | Das | G06F 11/0778 |
| 2024/0160773 | A1* | 5/2024 | Shmelkin | G06F 21/6245 |
| 2024/0169090 | A1* | 5/2024 | Vohra | G06F 21/6245 |
| 2024/0202358 | A1* | 6/2024 | Hampp-Bahnmueller | G06F 16/93 |
| 2024/0232419 | A1* | 7/2024 | Dixit | G06F 16/906 |
| 2024/0241988 | A1* | 7/2024 | Blum Shem-Tov | G06V 40/178 |

(56) References Cited

U.S. PATENT DOCUMENTS

2024/0265138 A1* 8/2024 Yannuzzi ............ G06F 21/6254
2024/0289498 A1* 8/2024 Kondapi ................. G06F 21/84
2024/0320240 A1* 9/2024 Podder ................ G06F 21/6245
2024/0333475 A1* 10/2024 Da Canal .............. H04L 9/3263
2024/0346168 A1* 10/2024 Gowda ............... G06F 21/6254
2024/0378306 A1* 11/2024 Lyle .................... G06F 21/6245
2024/0378373 A1* 11/2024 Buduguppa ........... G06F 40/117
2024/0411922 A1* 12/2024 Srinivasan .......... G06F 21/6245
2025/0036802 A1* 1/2025 Choncholas ........ G06F 21/6254
2025/0045451 A1* 2/2025 Ramakrishnan ....... G06N 20/10
2025/0063098 A1* 2/2025 Qian ....................... H04L 67/12
2025/0071109 A1* 2/2025 Liu ..................... H04L 63/0846
2025/0077295 A1* 3/2025 Pabón ................... G06F 9/5072
2025/0097226 A1* 3/2025 Fleming .................. G06F 9/541
2025/0124161 A1* 4/2025 Yvon ................... G06F 21/6245
2025/0131116 A1* 4/2025 Han ........................ G06F 21/60
2025/0156568 A1* 5/2025 Sui ...................... G06F 21/6245
2025/0165568 A1* 5/2025 Carpenter ........... G06F 21/6245
2025/0181758 A1* 6/2025 Wang ...................... G06F 9/541
2025/0181770 A1* 6/2025 Fraser ................. G06F 21/6254
2025/0182104 A1* 6/2025 Prokop ................ G06Q 20/027
2025/0190623 A1* 6/2025 Sreenidurai ............. H04L 63/04
2025/0193000 A1* 6/2025 Baldawa ................. H04L 67/55
2025/0202692 A1* 6/2025 Karia .................... H04L 9/3236
2025/0258906 A1* 8/2025 Thapa .................... G06N 3/098
2025/0265361 A1* 8/2025 Wen ...................... H04L 63/105
2025/0272428 A1* 8/2025 Srinivasan .......... G06F 21/6245
2025/0284727 A1* 9/2025 Halimi .................. G06F 16/367
2025/0300828 A1* 9/2025 Reddy Appireddygari Venkataramana ........ H04L 9/14
2025/0310774 A1* 10/2025 Vaughn ................. H04W 12/02
2025/0335214 A1* 10/2025 Wen ...................... G06F 21/604

OTHER PUBLICATIONS

Bahri et al "Privacy in Web Service Transactions: A Tale of More than a Decade of Work," pp. 448-465 (Year: 2018).*

Deng et al "Cloud-Native Computing: A Survey from the Perspective of Services," Proceedings of the IEEE, vol. 112, No. 1, pp. 12-46 (Year: 2024).*

Sofia et al "Dynamic, Context-Aware Cross-Layer Orchestration of Containerized Applications," IEEE Access, pp. 93129-93150 (Year: 2023).*

PCT International Search Report and Written Opinion, Application No. PCT/US2025/023856, dated Jul. 23, 2025, 10 pps.

* cited by examiner

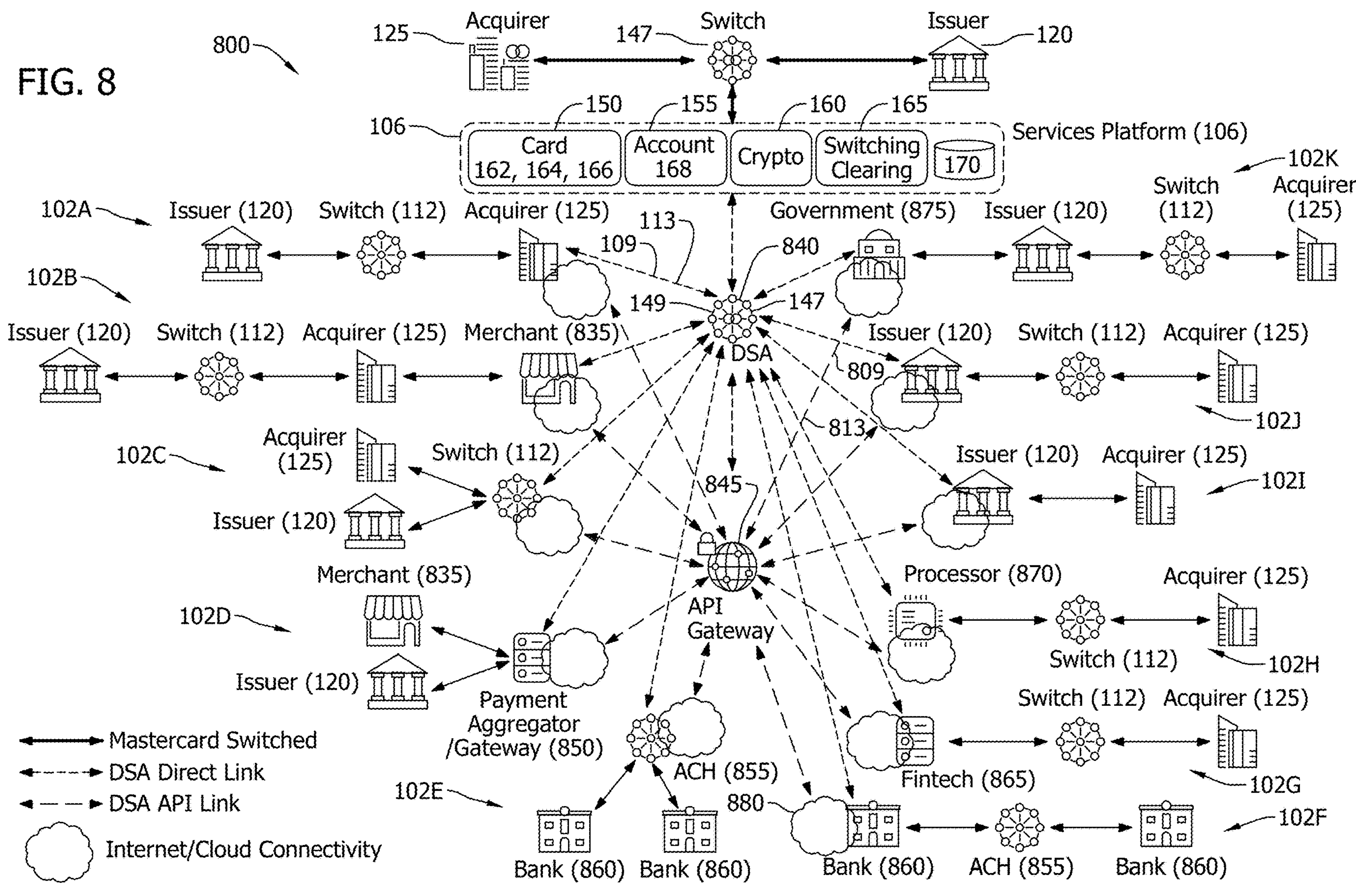

FIG. 8
800
125
Acquirer
147
Switch
Issuer
120
106
150
155
160
165
Card
162, 164, 166
Account
168
Crypto
Switching
Clearing
170
Services Platform (106)
102K
102A
Issuer (120)
Switch (112)
Acquirer (125)
113
109
Government (875)
840
Issuer (120)
Switch
(112)
Acquirer
(125)
102B
149
147
Issuer (120)
Switch (112)
Acquirer (125)
Merchant (835)
DSA
Issuer (120)
Switch (112)
Acquirer (125)
809
102J
813
102C
Acquirer
(125)
Switch (112)
Issuer (120)
Acquirer (125)
102I
845
Issuer (120)
Merchant (835)
Processor (870)
Acquirer (125)
102D
API
Gateway
Switch (112)
102H
Issuer (120)
Payment
Aggregator
/Gateway (850)
Switch (112)
Acquirer (125)
Mastercard Switched
DSA Direct Link
DSA API Link
Internet/Cloud Connectivity
ACH (855)
Fintech (865)
102G
102E
880
102F
Bank (860)
Bank (860)
Bank (860)
ACH (855)
Bank (860)

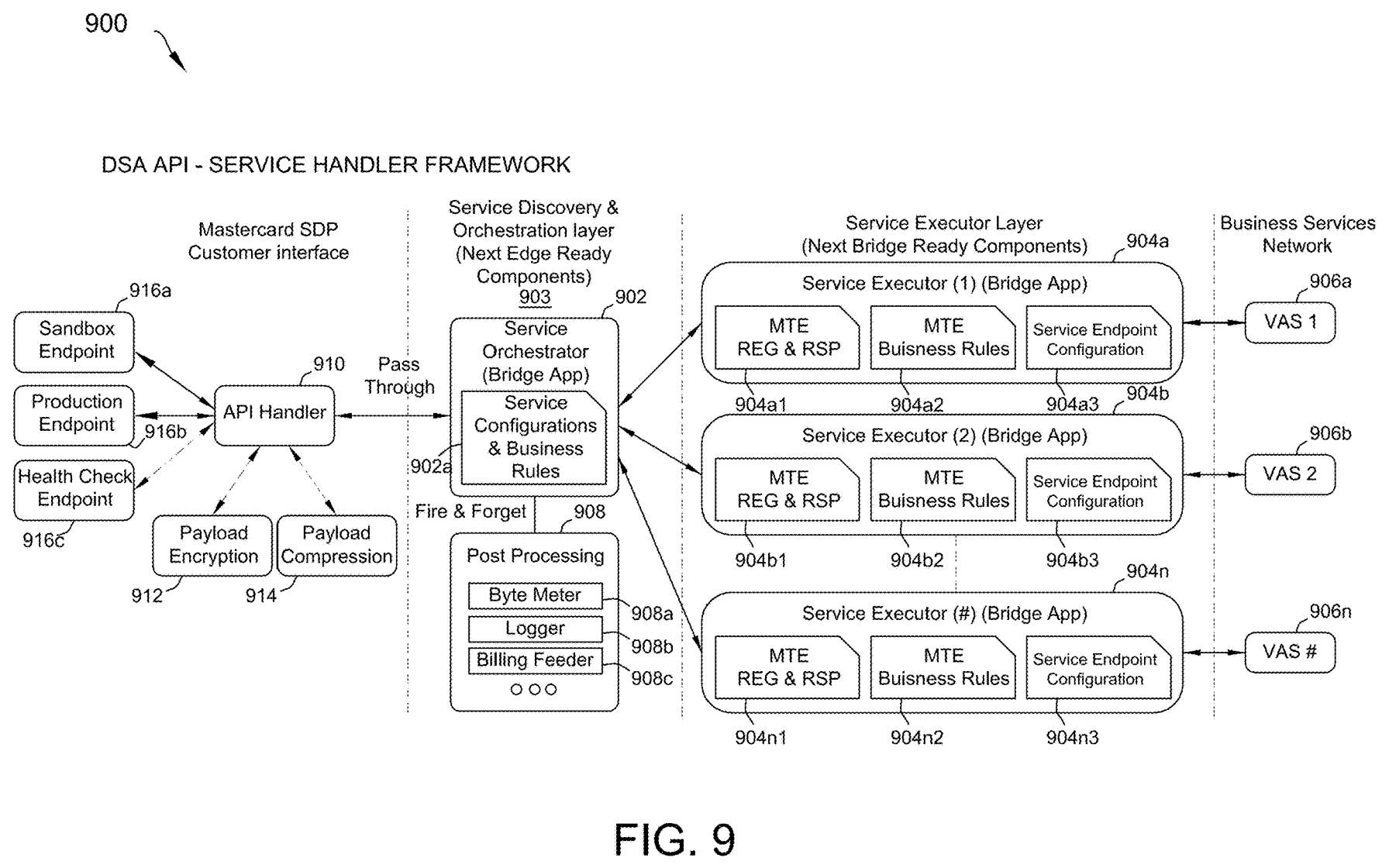

900

DSA API - SERVICE HANDLER FRAMEWORK

Mastercard SDP Customer interface

Service Discovery & Orchestration layer (Next Edge Ready Components) 903

Service Executor Layer (Next Bridge Ready Components)

Business Services Network

Sandbox Endpoint 916a

Production Endpoint 916b

Health Check Endpoint 916c

API Handler 910

Payload Encryption 912

Payload Compression 914

Pass Through

Service Orchestrator (Bridge App) 902

Service Configurations & Business Rules 902a

Fire & Forget

Post Processing 908

Byte Meter 908a

Logger 908b

Billing Feeder 908c

Service Executor (1) (Bridge App) 904a

MTE REG & RSP 904a1

MTE Buisness Rules 904a2

Service Endpoint Configuration 904a3

Service Executor (2) (Bridge App) 904b

MTE REG & RSP 904b1

MTE Buisness Rules 904b2

Service Endpoint Configuration 904b3

Service Executor (#) (Bridge App) 904n

MTE REG & RSP 904n1

MTE Buisness Rules 904n2

Service Endpoint Configuration 904n3

VAS 1 906a

VAS 2 906b

VAS # 906n

FIG. 9

SYSTEMS AND METHODS FOR DATA SEGREGATION AND SECURITY BASED ON ACCESS RIGHTS FOR ADDITIONAL SERVICES

BACKGROUND

The field of the disclosure relates generally to systems and methods for segregating data to provide improved data security prior to sending data to off-network service providers and, more particularly, to systems and methods for using a scalable orchestration framework configured to segregate various data elements of a transaction message based upon specific access rights granted to a service provider prior to sending only the permissioned data to the service provider.

In today's computer environment, messages that are created and transmitted over a first computer network are typically processed over that same computer network. By processing these messages within the same computer network, the data exchanged may be more securely sent and may require less translation or formatting services. Additionally, issues associated with access rights of the data being exchanged within the same computer network may not arise as the data is not leaving the computer network. However, in some cases, the home network may not provide all of the services needed for the processing of the messages. In these cases, the messages may need to be sent to another computer network for further processing.

In some cases, these messages are sent to another computer or network using an application programming interface (API). An API is a way for two or more computer programs or networks to communicate with each other. Thus, a message from one computer network having a payload that requires further processing by another computer on a separate network may be communicated to the other computer using an API. However, in some cases, the message payload may be in one format and the other computer may not be programmed to decipher that particular format so the message may need to be translated. Other issues in processing messages over a separate off-network may include limited access rights to data elements to a service or related service provider in the separate off-network. In other words, an off-network service provider may not have permissioned access to all of the data in a message payload, or the off-network service provider may not need all of the data included in a message payload to perform the additional off-network service. In those cases, providing the entire message payload to the off-network service provider poses significant risks.

For example, in the payment card industry, payment transactions may be initially processed over a first or home network. However, parties associated with the payment messages, such as issuer banks and cardholders, may require additional payment services, sometimes known as transaction enrichment services or value-added service, in conjunction with the transactions performed over a payment network. In some payment systems, these payment services allow a cardholder, using an interface, to register for such services.

These payment services may include, for example, predefined spending limits for a particular payment card. However, under many of these known systems, these payment services are only accessible for transactions performed over the "home" payment network. In other words, the payment services may only be applied to payment transactions that originate on and are processed over the payment network offering the payment services. These additional services can only be applied over the home network for security reasons and because these original messages are in a particular format for payment messages that is not easily translated into other formats for processing at an off-network computer. There may also be restrictions relating to where (geolocations, countries, etc.) the data can be sent, or which services or service provider may have access rights to various data elements of the data. Thus, in the payment industry, providing these additional value-added services to a payment transaction message by an off-network device, or by a service or a service provider in an off-network, is difficult to do and may pose significant data risks.

As more and more payment transactions are being performed on different payment networks or using services or service providers, it is desirable to offer payment services for transactions originating on payment networks other than the payment network where the transaction originated in a secured manner by transmitting data elements based on access rights of services or service provides in payment networks other than the originating payment network.

BRIEF DESCRIPTION

In one aspect, a scalable orchestration framework including an orchestrator platform is disclosed. The orchestrator platform includes at least one memory, and at least one processor in communication with the at least one memory. The at least one memory is configured to store instructions executable by the at least one processor, which when executed by the at least one processor, cause the at least one processor to: (i) receive, from a requestor computing device, a first request data message including a plurality of data elements; (ii) in response to receiving the first request data message, identify a total number of services of a plurality of value-added services to be invoked at a respective plurality of value-added services platforms to be applied to the first request data message; (iii) determine permissioned data elements of the plurality of data elements of the first request data message to be provided to each of the invoked value-added services; (iv) instantiate a service execution layer corresponding to each service of the plurality of services to be invoked at the respective plurality of services platforms; (v) provision each instantiated service execution layer with the permissioned data elements for the corresponding service of the plurality of services being invoked at the respective service platform; (vi) transmit a service request message to each of the invoked services using each instantiated service execution layer to receive a service response message from the respective service platform; and (vii) generate and transmit, to the requestor computing device, a first response data message based upon the received service response message from each instantiated service execution layer from the respective service platform.

In another aspect, a computer-implemented method performed at a scalable orchestration framework including at least one memory and at least one processor in communication with the at least one memory is disclosed. The computer-implemented method includes (i) receiving, from a requestor computing device at the at least one processor, a first request data message including a plurality of data elements; (ii) in response to receiving the first request data message, identifying, by the at least one processor, a total number of services of a plurality of value-added services to be invoked at a respective plurality of value-added services platforms to be applied to the first request data message; (iii) determining, by the at least one processor, permissioned data elements of the plurality of data elements of the first request data message to be provided to each of the invoked value-added services; (iv) instantiating, by the at least one processor, a service execution layer corresponding to each service of the plurality of services to be invoked at the respective plurality of services platforms; (v) provisioning, by the at least one processor, each instantiated service execution layer with the permissioned data elements for the corresponding service of the plurality of services being invoked at the respective service platform; (vi) transmitting, by the at least one processor, a service request message to each of the invoked services using each instantiated service execution layer to receive a service response message from the respective service platform; and (vii) generating and transmitting, by the at least processor, to the requestor computing device, a first response data message based upon the received service response message from each instantiated service execution layer from the respective service platform.

In yet another aspect, a non-transitory computer-readable medium (CRM) embodying programmed instructions is disclosed. The instructions, when executed by at least one processor of an orchestration platform, cause the at least one processor to: (i) receive, from a requestor computing device, a first request data message including a plurality of data elements; (ii) in response to receiving the first request data message, identify a total number of services of a plurality of value-added services to be invoked at a respective plurality of value-added services platforms to be applied to the first request data message; (iii) determine permissioned data elements of the plurality of data elements of the first request data message to be provided to each of the invoked value-added services; (iv) instantiate a service execution layer corresponding to each service of the plurality of services to be invoked at the respective plurality of services platforms; (v) provision each instantiated service execution layer with the permissioned data elements for the corresponding service of the plurality of services being invoked at the respective service platform; (vi) transmit a service request message to each of the invoked services using each instantiated service execution layer to receive a service response message from the respective service platform; and (vii) generate and transmit, to the requestor computing device, a first response data message based upon the received service response message from each instantiated service execution layer from the respective service platform.

BRIEF DESCRIPTION OF THE DRAWINGS

FIG. 8 illustrates an example configuration of a network services bridge computing system including a direct service access ("DSA") platform.

FIG. 9 illustrates an example direct service access ("DSA") API gateway service handler framework in accordance with the present disclosure.

DETAILED DESCRIPTION OF THE DISCLOSURE

Figure 1:
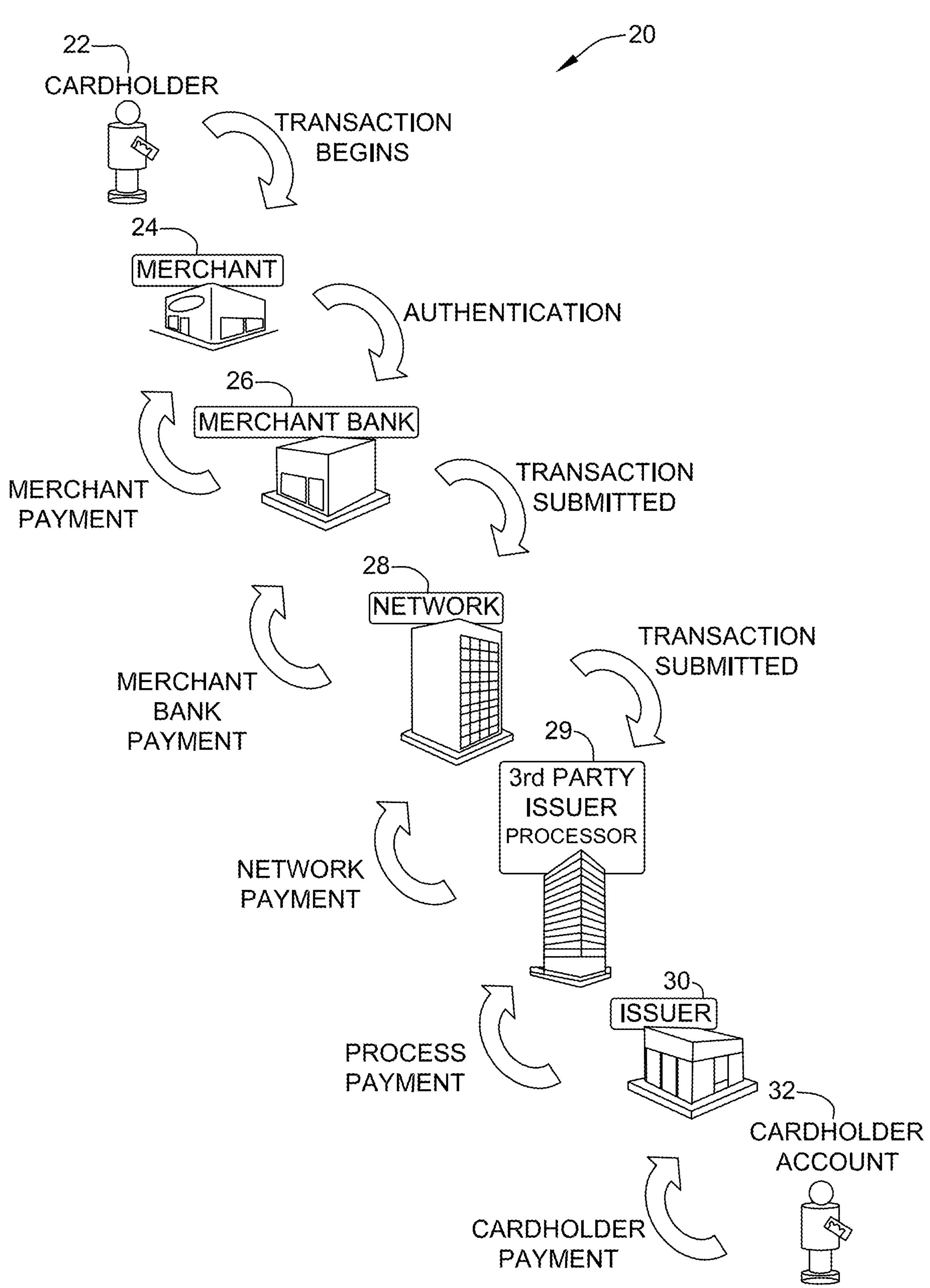
FIG. 1 is a schematic diagram illustrating an example multi-party payment card industry system for enabling payment transactions between merchants and card issuers.

The following detailed description illustrates embodiments of the disclosure by way of example and not by way of limitation. It is contemplated that the systems and processes described herein have general application to the aspect of processing payment card transactions. More specifically, the embodiments of the systems and methods described herein relate generally to a payment card transaction that is initiated over a first payment network (e.g., the home network), and a payment services computer system that is associated with a second payment network (e.g., off network), wherein the payment services computer system is configured to receive a request from a requestor to apply payment services to the transaction, apply the payment services to the transaction, and transmit an output to the requestor. Because this transaction is initiated on one payment network (e.g., the first payment network), and processed by the payment services computer system on another payment network (e.g., the second payment network), the transaction is sometimes referred to as an off-network transaction. In the example embodiment, an off-network payment card transaction is a payment card transaction that is initiated and processed over a payment network that is different from the payment network providing payment services to the transaction. Accordingly, the embodiments of the systems and methods described herein may be applicable to transaction processing in which data may be required to be transmitted to a service or a service provider in an off-network while maintaining data security according to data access rights of the service or the service provider in the off-network.

Described in detail herein are example embodiments of systems and methods for creating a scalable orchestration framework for communicating payment messages generated on a home network with an off-network that provides certain payment services, sometimes referred to herein a value-added services (VAS). The orchestration framework may allow an orchestration layer of the orchestration framework to intercept a service request message and to decode a payload of the service request message using a decompression technique to identify a nature and key data elements of the service request message. The key data elements of the service request message are identified or segregated based upon specific access rights granted to a service and a related service provider in the off-network or based upon the key data elements required by a service and a related service provider in the off-network. Accordingly, service providers (also referenced herein as partners) may only have access to view or use data elements for which they have access rights while providing the services as per a service agreement or contract with the home network. The orchestration layer of the orchestration framework may be referenced herein as a Bridge Application (or Bridge App).

The Bridge App may dynamically create a temporary service execution layer at a cloud computing resource to provide a VAS corresponding to the identified nature and key data elements of the service request message, and associate service end point configurations and other business rules for the VAS. If the Bridge App determines that more than one service execution layer is needed, the Bridge App may create more than one service execution layer. The Bridge App is configured to connect each created service execution layer with a respective VAS for receiving required services (e.g., recommendations, query responses, etc.), which are subsequently passed back to the Bridge App when the VAS has been executed. The Bridge App may then decide if another VAS needs to be contacted or a service response may be generated for the received service request message.

As described herein, various entities (e.g., issuers, acquirers, service providers, etc.) of a payment processing eco-system are registered to process a transaction with the home network. However, the transaction communicated with an entity of the eco-system may include data elements that are based on access rights of the data elements granted to the entity to provide a specific service. The entities of the eco-system may provide services in real-time during the transaction processing flow. The services may include, but are not limited to, tax calculation, consumer scoring, authorization advising, data enrichment, transaction insurance, and many other services that could be provided by a third-party service that relate to the processing of payment transactions. By way of a non-limiting example, for each service being provided by a service provider in an off network, a set of data elements required may be predetermined or predefined. The set of data elements required for each service may be predetermined or predefined based on a service contract between the entities of the eco-system. The set of data elements exchanged during transaction flow may thus ensure consistent and secure transactions between entities of the eco-system while protecting the data from unnecessary exposure. Additionally, or alternatively, new services or service providers may be added to the eco-system without substantial overhaul of the eco-system, or existing service contracts between different entities of the eco-system.

As described herein, the orchestration framework is configured to read the payload of a transaction message in an ISO/API format and based on the decompression technique, the orchestration layer (Bridge App) identifies the nature and key data elements of the transactions. The Bridge App during run time, based on these key data elements, dynamically creates a temporary service execution layer in a cloud environment with intended service end point configurations and other business rules, for example, business rules specifying a list of key data elements, a structure, and a format of data exchange according to a respective data contract of each service type, deployed. The number of service execution layers required is determined by the Bridge App, and each layer will be connected to a value-added service (VAS) for receiving the recommendation. The recommendation response is passed on to Bridge App, which decides if a decision needs to be made or another VAS needs to be performed on the same transaction.

In known conventional systems, there is lack of a scalable value-added services execution frameworks that can handle multiple service calls for a single transaction dynamically. These systems also lack the ability to perform these services or restrict these services to within a certain geographic boundary, or to exchange data elements based on a respective service contract with each service of the services. The present system addresses these problems and others described herein.

The orchestration framework is programmed to use a decompression technique for reading an API payload and passing it on to the Bridge App (orchestration layer), where the Bridge App includes the logic to read individual data elements and decide how many services need to be performed on a transaction. Based on the number of VASs to be performed, the Bridge App will create a desired number of service execution layers in the cloud as temporary memory and push all the required configurations and end points which will route the transaction, including just those data elements required and provided for within the service contract corresponding to each service, to the intended VAS. Each VAS will provide its score or output, which may be held until all services execution are done and a final recommendation is sent to the requestor of the service after which the memory will be erased or released. This helps to ensure that no desired services and associated data is travelling outside data policy boundaries, as defined by a service contract corresponding to a service, while still allowing for scalable services.

Described in detail herein are example embodiments of systems and methods for applying off-network payment services to a home payment network payment transaction using the orchestration framework and Bridge App described herein. The systems and methods facilitate, for example, applying off-network payment services such as cardholder authorization controls to a home payment network payment transaction, wherein the authorization controls are configured to identify, for example, whether the transaction was initiated outside a geographical region allowed by the authorization controls. The systems and methods described herein include a payment services computer system configured to receive a request associated with a payment transaction from a first payment network (e.g., a payment network that is not hosting the payment services) at a second payment network (e.g., a payment network that is hosting the payment services), apply the payment services and/or other value-added services through the Bridge App, as appropriate, to the payment transaction, and transmit an output to the requestor.

The methods and systems described herein may be implemented using computer programming or engineering techniques including computer software, firmware, hardware or any combination or subset thereof, wherein the technical effect may be achieved by performing at least one of the following steps: (a) receiving a service request generated by a requestor at a payment services computer system, where the service request includes a data packet of a plurality of data elements and relates to a first payment network payment card transaction, and where the service request has a first format that is readable by a second payment network; (b) determining, at the payment services computer system, the payment services the service request is registered to receive; (c) parsing the data packet by segregating the data elements based upon at least one service contract with each service provider associated with providing each of the payment service, wherein only specific data elements are provided to each of the service providers for security purposes; (d) processing of the service request by providing the parsed data packets to each of the service providers registered to provide the payment services to the service request; (e) generating a services response based at least in part on the registered payment services and payment transaction data associated with the first payment network payment card transaction; and (f) transmitting the service response to at least one of the requestor and a cardholder of payment account associated with the first payment network payment card transaction.

In another embodiment, the methods and systems described herein may be implemented using computer programming or engineering techniques including computer software, firmware, hardware or any combination or subset thereof, wherein the technical effect may be achieved by performing at least one of the following steps: (a) receiving, at a service orchestrator, a service request generated by a requestor at a payment services computer system, where the service request includes a data packet of a plurality of data elements and relates to a first payment network payment card transaction, and where the service request has a first format that is readable by the first payment network; (b) determining, at the service orchestrator, the payment services or value-added services required by the service request based on decoding payload data of the service request; (c) determining, at the service orchestrator, permissioned data elements to be provided to each payment service for performing the service by performing a lookup within service rules stored within the memory; (d) generating one or more service execution layers associated with the value-added services required by the service request wherein each service execution layer includes a respective service end point configuration file, a business rules file for translating and applying the service request, and the permissioned data elements for that corresponding service; (e) communicating the service request with the value added services using the service execution layers to translate the service request; (e) receiving, at the service orchestrator, a service response based at least in part on outputs from the value-added services received at the one or more service execution layers; and (e) transmitting the service response to at least one of the requestor and a cardholder of payment account associated with the first payment network payment card transaction.

As used herein, an acquiring bank or acquirer is typically a bank (or financial institution) at which a merchant holds an account. Further, an issuing bank or issuer (or financial institution) is typically a bank at which a customer or cardholder holds an account. The account may be debited or charged through the use of a debit card, a credit card, or another type of payment card as described herein.

As used herein, the terms "payment card," "financial transaction card," and "transaction card" refer to any suitable payment card, such as a credit card, a debit card, a prepaid card, a charge card, a membership card, a promotional card, a frequent flyer card, an identification card, a gift card, and/or any other device that may hold payment account data, such as mobile phones, smartphones, smart cards, digital wallets, personal digital assistants (PDAs), key fobs, and/or computers. Each type of payment card can be used as a method of payment for performing a transaction. In addition, cardholder account behavior can include but is not limited to purchases, management activities (e.g., balance checking), bill payments, achievement of targets (meeting account balance goals, paying bills on time), and/or product registrations (e.g., mobile application downloads).

As used herein, the term "translation module" and related terms, e.g., "translation module system," refers to a method of converting service requests from a format used on the first payment network (e.g., by an issuer bank) to a format that may be read by the second payment network and vice versa. The translation module may include, without limitation, a data layout protocol, an algorithm for mapping service requests from the first payment network format to the second payment network format and vice versa, and an automated program that converts service requests from the first payment network format to the second payment network format and vice versa.

As used herein, the term "home payment network" and related terms, e.g., "home network," refers to a first payment network where the cardholder originates payment card transactions and may register for payment services (whether those services are actually provided by or performed by the home network). Such home payment networks may include any payment networks capable of using the system and method described herein.

As used herein, the term "off-network payment network" and related terms, e.g., "off-network," may refer to a second payment network that is different from the home payment network where a payment card transaction may be originated. As used herein, off-network payment network is capable of receiving service requests from home payment network and providing payment services for payment card transactions originating with home payment network by cardholders who have registered for the payment services using, for example, the home payment network.

As used herein, the term "network processor" and related terms, e.g., "off-network processor" and "home network processor," refers to computing device(s) associated with a payment network that may be used to communicate data between computing devices associated with an issuer bank, a cardholder, a merchant, an acquirer bank, a payment aggregator, a payment gateway, a government, a financial technology ("Fintech") system, and/or an account clearing house ("ACH") system, and communicate with computing device(s) that may be used to provide network services such as payment services. Also, as used herein, the home network processor may be configured to receive requests from a requestor and send first service requests to the translation module.

As used herein, the term "requestor" refers to the creator and sender of a first service request based upon account registration or a payment transaction. The requestor is the person or entity that is requesting the value-added service (VAS), which in some cases is done on behalf of another party, who is sometimes referred to as the VAS recipient or the entity receiving or getting the VAS service (e.g., the entity paying for the VAS service or on whose behalf the VAS service is being carried out). Thus, the requestor may be either the aggregator, processor, ACH etc. who request the service, and the entity receiving the VAS service may be for example: the merchant, the acquirer, the card issuer, the bank account institution (whose IBAN is it), and/or crypto exchange (Bitstamp, Binance, etc. or whoever owns the crypto wallet sending or receiving a payment). Also, as used herein, the requestor generates the first service request and uses either the requestor computing device translation module or the receiving network computing device translation module to translate or convert it to a second service request. Another option would be to use a REST connection to provide the translation.

As used herein, a processor includes a programmable system including systems using microcontrollers, reduced instruction set circuits (RISC), application specific integrated circuits (ASICs), logic circuits, and any other circuit or processor capable of executing the functions described herein. The above examples are example only, and thus are not intended to limit the definition and/or meaning of the term "processor" in any way.

In one embodiment, computer-executable instructions are provided and are embodied on a non-transitory computer readable storage medium. The computer-executable instructions cause a computer executing the instructions to utilize a Structured Query Language (SQL) with a client user interface front-end for administration and a web interface for standard user inputs and reports. In an example embodiment, the system is web-enabled and is run on a business entity intranet. In an alternative embodiment, the system is fully accessible by individuals having authorized access from outside a firewall of the business-entity through the Internet. In a further alternative embodiment, the system is run in a Windows® environment (Windows is a registered trademark of Microsoft Corporation, Redmond, Wash.). The application is flexible and designed to run in various different environments without compromising any major functionality.

FIG. 1 is a schematic diagram illustrating an example multi-party payment processing system 20 for enabling payment transactions between merchants 24 and card issuers 30 in accordance with one embodiment of the present disclosure. Embodiments described herein may relate to a payment card system, such as a credit or debit card payment system using the Mastercard® interchange network (Mastercard is a registered trademark of Mastercard International Incorporated located in Purchase, New York). The Mastercard interchange network is a set of proprietary communications standards promulgated by Mastercard International Incorporated for the exchange of financial transaction data and the settlement of funds between financial institutions that are members of Mastercard International Incorporated.

In a typical payment card system, a financial institution called the "issuer" issues a payment card, such as a credit card or debit card, to a consumer or cardholder 22, who uses the payment card to tender payment for a purchase from a merchant 24. To accept payment with the payment card, merchant 24 must normally establish an account with a financial institution that is part of the financial payment system. This financial institution is usually called the "merchant bank," the "acquiring bank," or the "acquirer," such as a merchant bank 26. When cardholder 22 tenders payment for a purchase with a payment card, merchant 24 sends an authorization request message to merchant bank 26 for the amount of the purchase. The request may be performed over the telephone, but may be also performed through the use of a computing device having access to a website or a computer app enabling input of cardholder's 22 account information, or the use of a point-of-sale device, which reads cardholder's 22 account data from a magnetic stripe, a chip, or embossed characters on the payment card and communicates electronically with the transaction processing computers of merchant bank 26. Alternatively, merchant bank 26 may authorize a third party to perform transaction processing on its behalf. In this case, the point-of-sale device will be configured to communicate with the third party. Such a third party is usually called a "merchant processor," an "acquiring processor," or a "third party processor."

Using an interchange network 28, computers of merchant bank 26 will communicate transaction data with computers of an issuer processor 29 associated with an issuer 30. Issuer processor 29 may be a third party processor authorized to perform transaction-related services or value-added services on behalf of issuer 30 in accordance with embodiments of the present disclosure and as described in further detail hereinbelow. The transaction related services or value-added services may include, but are not limited to, payment card production services, payment card processing services, fraud detection services, data delivery services, ATM driving services, transaction research, and cardholder support services. Issuer processor 29 may also provide interbank switch processing, including authorization, and clearing and settlement. This enables issuer 30 to use one card processor for all different payment card brands. In an alternative embodiment, issuer processor 29 may be associated with interchange network 28 and may provide similar services.

Issuer 30 receives the transaction data from issuer processor 29, and then determines whether cardholder's 22 account 32 is in good standing and whether the purchase is covered by cardholder's 22 available credit limit. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as Mastercard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale device. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer 30 stores the payment card data, such as a type of merchant, amount of purchase, date of purchase, in a database 308 (shown in FIG. 4).

After a purchase has been made, a clearing process occurs to transfer additional transaction data related to the purchase among the parties to the transaction, such as merchant bank 26, interchange network 28, issuer processor 29, and issuer 30. More specifically, during and/or after the clearing process, additional data, such as a time of purchase, a merchant name, a type of merchant, purchase data, cardholder account data, a type of transaction, itinerary data, data regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, interchange network 28, issuer processor 29, and issuer 30. Settlement refers to the transfer of financial data or funds among merchant's 24 account, merchant bank 26, issuer processor 29, and issuer 30 related to the transaction. Usually, transactions are captured and accumulated into a "batch," which is settled as a group. More specifically, a transaction is typically settled between issuer 30 and issuer processor 29, and then between issuer processor 29 and interchange network 28, and then between interchange network 28 and merchant bank 26, and then between merchant bank 26 and merchant 24.

As described below in greater detail, in some embodiments, one or more of the parties involved in a payment transaction may request that value-added services be applied to the transaction, wherein the value-added services are executed by one or more service providers outside of the payment network. In other words, the transaction data may need to be sent to an off-network device to provide the requested services. However, as described further below, not all data elements received in the payment transaction message may be required by each service to provide the corresponding service, or not all data elements may be permissioned and transmitted to each service being provided by an off-network device. Accordingly, the payment transaction message may be parsed and the data elements included therein may be segregated based upon a service contract stored in memory for each corresponding service provider such that only permissioned data elements will be transmitted to each of the services provided by the off-network device so that the data is better protected from possible breach and only the necessary data is exchanged.

Figure 2:
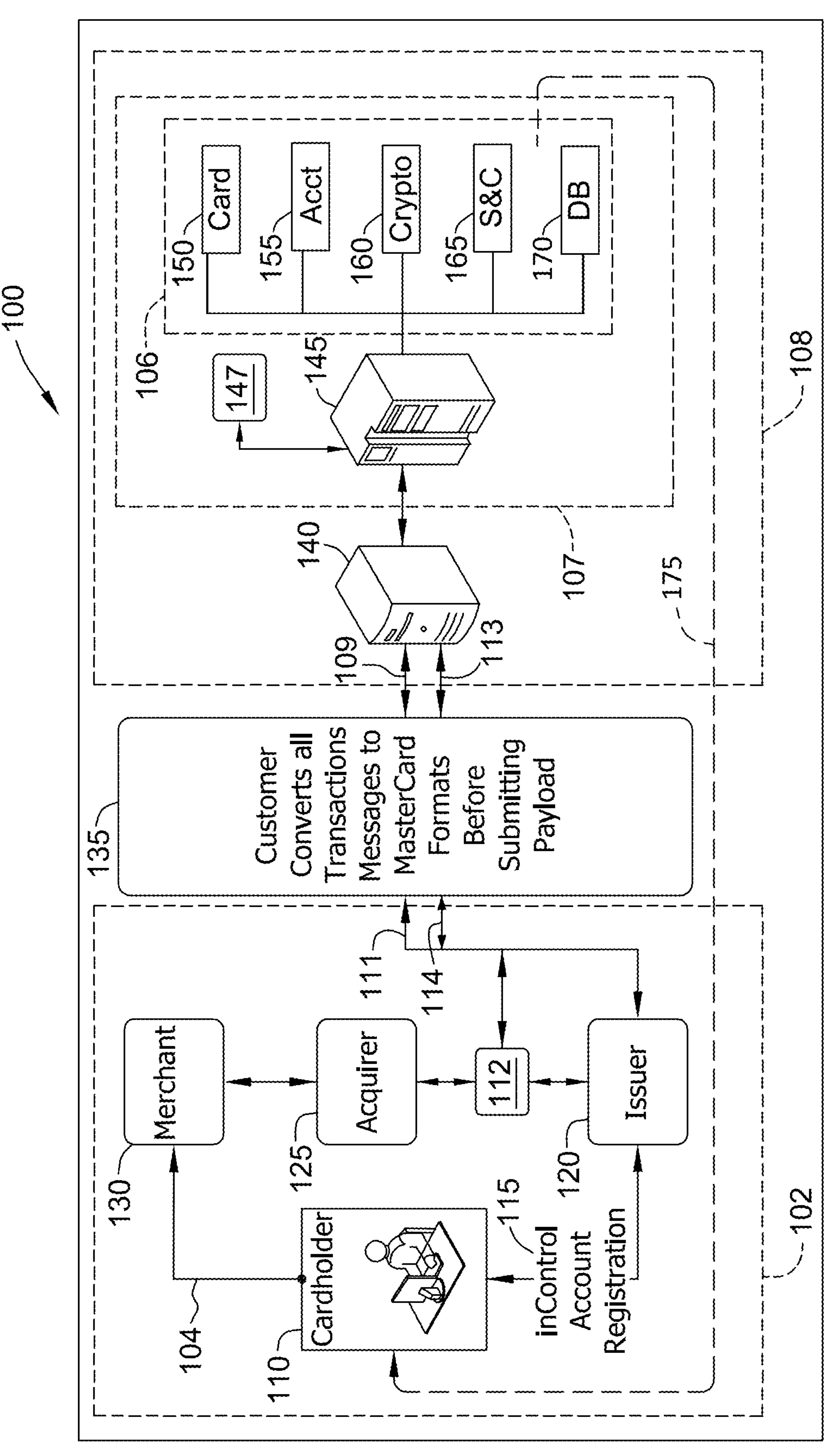
FIG. 2 is a data flow diagram showing a payment processing environment in accordance with one embodiment of the present disclosure.

FIG. 2 is a data flow diagram showing a payment processing environment 100 in accordance with one embodiment of the present disclosure. Environment 100 includes a home payment network 102 where a payment transaction 104 or account registration 115 originates and a first service request 111 is sent, a transfer process 135 where first service request 111 is converted to a second service request 109, and an off-network payment network 108 where a payment services computer system 107 resides.

Home payment network 102 includes a cardholder 110, an issuer 120, an acquirer 125, a merchant 130, and home network processor 112. Cardholder 110, issuer 120, acquirer 125, merchant 130, and home network processor 112 may be similar to cardholder 22, issuer 30, merchant bank 26, merchant 24, and issuer processor 29, respectively, as shown in FIG. 1.

Cardholder 110 is capable of making payment transaction 104 to merchant 130 by initiating payment transaction 104 with merchant 130. Cardholder 110 is also capable of account registration 115 with issuer 120. Home payment network 102 is capable of communicating with off-network payment network 108 by sending first service request 111 associated with account registration 115 and/or payment transaction 104 to transfer process 135. First service request 111 may be sent by home network processor 112 and/or issuer 120 and/or other requestors including, but not limited to, acquirers, merchants, payment aggregators, payment gateways, government entities, financial technology ("Fintech") systems, and account clearing house ("ACH") systems, which may request the VAS service on behalf of another entity who is the recipient of the VAS service.

Transfer process 135 is configured to allow first service request 111 to be converted to second service request 109 that may be processed using payment services computer 107 at off-network payment network 108. Transfer process 135 includes converting first service request 111 into second service request 109 using a translation module. In the example embodiment, the translation module refers to a data layout protocol indicating a method of converting a first data file format associated with home payment network 102 (e.g., first service request 111) to a second data file format associated with off-network payment network 108 (e.g., second service request 109). In alternative embodiments, the translation may include, without limitation, an algorithm for mapping service requests from the first data file format to the second data file format and/or a data segregator for segregating data elements included in first service request 111 so that only permissioned data is included in second service request 109, and/or an automated program that converts first service request 111 to second service request 109. Transfer process 135 is also configured to send second service request 109 to an interface processor 140 at off-network payment network 108. Transfer process 135 further includes enabling first services responses 113 to be converted to second services responses 114 (described below). The transfer module is accordingly also configured to convert a second data file format associated with off-network payment network 108 to a first data file format associated with home payment network 102.

Off-network payment network 108 includes interface processor 140, an off-network processor 147, and payment services computer system 107. Interface processor 140 is representative of a computing device capable of receiving second service request 109 from transfer process 135. Interface processor 140 is also capable of determining whether second service request 109 contains account identifiers associated with payment services 106. Interface processor 140 is further capable of communicating with payment services computer system 107 to register or apply payment services 106.

Payment services computer system 107 includes a payment services platform 145, such as the Mastercard® inControl™ platform ("MIP"). Mastercard® inControl™ platform is a proprietary payment services platform created by Mastercard International Incorporated® for providing cardholder services associated with the exchange of financial transaction data between financial institutions that are members of Mastercard International Incorporated®. (Mastercard is a registered trademark of Mastercard International Incorporated located in Purchase, New York). Payment services platform 145 is capable of communicating with interface processor 140 and registering an account to use payment services 106 or applying payment services 106 associated with home payment network 102 to payment transaction 104. Payment services computer system 107 also includes off-network processor 147 which is capable of communicating with off-network issuer bank (not shown) and providing payment services 106 to transactions initiated by an off-network cardholder (not shown).

Cardholder 110 initially registers for payment services 106 (VAS services) with issuer 120 using account registration 115. The registration may be API driven. In some cases, cardholder 110 may also register with other parties utilizing the system or by deriving the relationship between cardholder 110 and issuer 120 from the PAN and the bank account IBAN used for the transaction or alternatively by deriving the relationship between the PAN, the bank account and the wallet ID by certain parties involved in the transaction. For example, the relationship between cardholder 110 and issuer 120 may be known by issuer 120 or derived by acquirer 125 using information associated with the relationship between merchant 130 and cardholder 110.

In the example embodiment, account registration 115 represents a web-based service allowing cardholder 110 to register for payment services 106 at a website hosted by issuer 120. In the example embodiment, issuer 120 transmits registration information to home network processor 112 which converts registration information using transfer process 135 to a format that may be received by interface processor 140. In alternative embodiments, issuer 120 may convert registration information using transfer process 135 without using home network processor 112. In the example embodiment, account registration 115 includes an account identifier (e.g., an account number) associated with the payment card used for initiating payment transaction 104. The account identifier may be a primary account number (PAN), a real card number (RCN), or any other type of identifier that identifies or represents an account associated with payment transaction 104.

Account registration 115 further includes payment services 106 to be associated with the account identifier. In the example embodiment, payment services 106 may include card services 150, account services 155, cryptocurrency services 160, and switching clearing services 165. Records associated with payment services 106 are stored in a registered services database 170 accessible by payment services platform 145. For example, when a requestor on home network 102 registers with off-network payment network 108 for access to the one or more services 106, a record is stored in registered services database 170.

Account registration 115 also includes using transfer process 135 to convert registration data to a format that can be used with payment services computer system 107. Transfer process 135 uses the translation module to convert registration data into a registration profile and transmits the registration profile to payment services computer system 107. Here, the translation module is used to convert a first data file format associated with home payment network 102 (e.g., registration data) to a second data file format associated with off-network payment network 108 (e.g., the registration profile). In the example embodiment, transfer process 135 may also include and/or store a service contract associated with each service provider that includes rules for identifying the specific data elements that are permissioned to be provided to each of the service providers for providing the registered service. Thus, transfer process 135 may be configured to receive first service request 111, parse the data included in first service request 111, apply the service contract rules, and only include permissioned data within second service request 109 that is provided to the off-network 108.

Once cardholder 110 has registered 115 for payment services 106 and the registration profile has been transmitted to interface processor 140 and sent to payment services computer system 107, payment services computer system 107 is capable of providing payment services 106 when cardholder 110 initiates payment transaction 104 over home payment network 102.

Cardholder 110 further initiates payment transaction 104 over home payment network 102 with merchant 130 using a payment card. Payment transaction 104 includes an account identifier (e.g., a PAN) and transaction details. Payment transaction 104 also includes payment transaction data. The payment transaction data may include, without limitation, the time of payment transaction 104, the date of payment transaction 104, the amount of payment transaction 104, merchant 130 associated with payment transaction 104, the category associated with merchant 130 associated with payment transaction 104, the geographic location of payment transaction 104, and the purchase category (e.g., food, clothing, or computers) of payment transaction 104.

Merchant 130 then sends an authorization request over home payment network 102 for payment transaction 104 to acquirer 125. Acquirer 125 sends the authorization request along to issuer 120. In one embodiment, acquirer 125 transmits the authorization request to home network processor 112 which determines whether the account associated with payment transaction 104 is eligible for payment services 106. In alternative embodiments, home network processor 112 sends the authorization request to issuer 120, and issuer 120 determines whether the account associated with payment transaction 104 is eligible for payment services 106. The entity that determines whether the account associated with payment transaction 104 is eligible for payment services 106 is defined as a requestor and generates first service request 111. In some cases, the entity that determines whether the account is eligible for payment services 106 may include entities such as: the merchant, the acquirer, the issuer, the processor, the aggregator or any other party involved in the transaction that is able to derive the relationship between the cardholder and the issuer from the data being processed. Determining whether the account is eligible for payment services 106 is representative of determining whether cardholder 110 has registered the account identifier included in the authorization request with payment services 106. In the example embodiment, home network processor 112 will search a memory device, such as registered services database 170, to determine if the account identifier is registered with issuer 120 for payment services 106. In other embodiments, issuer 120 will search a memory device, such as registered services database 170, to determine if the account identifier is registered with issuer 120 for payment services 106. In alternative embodiments, issuer 120 may send a request to off-network payment network 108 to determine if the account identifier included in the authorization request is registered with payment services 106.

If the account is eligible, the requestor will continue to process payment transaction 104, and will generate first service request 111. First service request 111 is converted, using transfer process 135, into second service request 109. Transfer process 135 uses the translation module to convert first service requests 111 to second service requests 109. The translation module ensures that second service requests 109 conform to identical file naming conventions, file header conventions, file structure and layout conventions, file type conventions, file size conventions, and permissioned data elements according to the service contract. In an alternative embodiment, first service requests 111 are converted using a translation module implementing XML-based transformational methods. In other embodiments, first service requests 111 may be converted using translation modules implementing any transformational method or language including, without limitation, Perl, AWK, TXL, or any other method capable of converting first service requests 111 to apply names, headers, layouts, structures, file types, permissioned data elements, and file sizes required for second service requests 109.

Second service request 109 is transmitted to and received by interface processor 140 which determines whether the account identifier associated with second service request 109 is registered for payment services 106. If the account identifier associated with second service request 109 is determined to be registered for payment services 106, interface processor 140 transmits second service request 109 to payment services platform 145. Payment services platform 145 processes second service request 109 by applying registered payment services 106 to second service request 109. Applying registered payment services 106 represents applying at least one payment service 106 if second service request 109 requires such application. As described above, payment services 106 include card services 150, account services 155, cryptocurrency services 160, and switching clearing services 165. Each payment service 106 is associated with rules and conditions for applying service 106. If payment service 106 should be applied, payment services platform 145 generates first services response 113 based, at least in part, on payment services 106 and payment transaction data associated with second service request 109. Payment services computer system 107 transmits first services response 113 to interface processor 140. First services response 113 is then sent back to transfer process 135.

Here, transfer process 135 uses the translation module to facilitate converting first services responses 113 into second services responses 114. The translation module is now used to reverse the process described when first service request 111 was converted to second service request 109. The transfer module allows a reversed conversion of first services responses 113 into second services responses 114 conforming to identical file naming conventions, file header conventions, file structure and layout conventions, file type conventions, and file size conventions associated with home payment network 102. In the example embodiment, first services responses 113 are converted using a translation module implementing XML-based transformational methods. In alternative embodiments, first services responses 113 may be converted using translation modules implementing any transformational method or language including, without limitation, Perl, AWK, TXL, or any other method capable of converting first services responses 113 to apply names, headers, layouts, structures, file types, and file sizes required for second services responses 114.

Second services response 114 is then transmitted back to the requestor (e.g., home network processor 112 or issuer 120) that sent first service request 111 to transfer process 135. In the example embodiment, when the requestor is home network processor 112, the requestor will communicate with acquirer 125 (e.g., return an authorization response denying or approving a payment transaction to merchant 130 based upon the application of transaction rules and limits service) and/or cardholder 110 (e.g., to alert cardholder based upon the application of payment services 106) depending on the contents of second services response 114. In alternative embodiments, when the requestor is issuer 120, the requestor will either act on the contents of second services response 114 (e.g., instruct acquirer 125 to deny or approve a payment transaction based upon the application of transaction rules and limits service) or communicate with cardholder 110 (e.g., to alert cardholder based upon the application of payment services 106).

Payment transaction 104 may be associated with an account identifier that is registered for payment services 106. In this example, payment transaction 104 is processed as described above and results in at least one of two outcomes. First, first services response 113 may be generated and converted to second services response 114 resulting in alerting cardholder 110 that the payment card associated with cardholder 110 has been used in payment transaction 104. Second, payment services 106 may trigger an SMS (i.e., Short Message Service text messaging) or email alert 175 sent directly from payment services computer system 107.

In the first example, cardholder 110 may use account registration 115 which creates a registration profile on payment services computer system 107. The registration profile may include information reflecting that cardholder 110 would like to be notified by the requestor when the credit card balance associated with cardholder 110 exceeds a threshold of $3,000. The registration profile is therefore registered for payment services 106 with this condition (e.g., alerts should be sent by the requestor when the credit card balance exceeds $3,000) applied. Payment transaction 104 is made for $500 using account identifiers corresponding to cardholder 110 with merchant 130. Prior to payment transaction 104, the credit card balance associated with cardholder 110 was $2,900. Payment transaction 104 results in first service request 111 being generated by the requestor. First service request 111 is converted using transfer process 135 to second service request 109. Second service request 109 is received by interface processor 140 which determines that the account identifier associated with second service request 109 is registered for payment services 106 and transmits second service request 109 to payment services platform 145. Payment services platform 145 determines that second service request 109 is associated with an account identifier which is registered for payment services 106. Payment services platform 145 processes second service request 109 and determines that payment transaction data included indicates that second service request 109 is associated with payment transaction 104 which has moved the credit card balance associated with cardholder 110 to $3,400. Payment services platform 145 also determines payment services 106 requires that the requestor must alert cardholder 110. Payment services platform 145 generates first services response 113 including an instruction that the requestor send an alert to cardholder 110 in accordance with payment services 106. First services response 113 is converted to second services response 114 using transfer process 135. Second services response 114 is sent to the requestor. The requestor sends an electronic alert to a computing device associated with cardholder 110 indicating that the credit card balance associated with cardholder 110 has exceeded the threshold of $3,000.

In the second example, cardholder 110 also uses account registration 115 and creates a registration profile on payment services computer system 107. However, in this example, the registration profile may include information reflecting that cardholder 110 would like to be notified by payment services computer system 107 (rather than the requestor) when the credit card balance associated with cardholder 110 exceeds a threshold of $3,000. The registration profile is therefore registered for payment services 106 with this condition (e.g., alerts should be sent by payment services computer system 107 when the credit card balance exceeds $3,000) applied. As in the first example, payment transaction 104 causes the credit card balance associated with cardholder to exceed $3,000. Again, payment transaction 104 results in first service request 111 being generated by the requestor. First service request 111 is again converted using transfer process 135 to second service request 109 where only permissioned data is provided in second service request 109 per the service contract stored for that particular service provider. Second service request 109 is received by interface processor 140 which determines that the account identifier associated with second service request 109 is registered for payment services 106 and transmits second service request 109 to payment services platform 145. Payment services platform 145 determines that second service request 109 is associated with an account identifier which is registered for payment services 106. However, payment services platform 145 determines that second service request 109 is associated with an account identifier which is registered for SMS or email alerts 175 from payment services computer system 107. In this case, in addition to generating a first services response 113 (informing the requestor of the alert), payment services computer system 107 sends an SMS text message directly to a computing device associated with cardholder 110. This option may be valuable for cardholders 110 who value speed or where the requestor lacks the ability to communicate with cardholder 110 electronically.

Payment transaction 104 may also be associated with an account identifier that is registered for card services 150, account services 155, cryptocurrency service 160, and switching and clearing services 165. In this case, cardholder 110 may use account registration 115 which creates a registration profile on payment services computer system 107. The registration profile may include information reflecting that cardholder 110 would like to be able to use services 150, 155, 160, and 165 in conjunction with payment transactions 104.

For example, cardholder 110 may use card services 150 to use a digital enablement services platform for management, generation, and provisioning of digital payment credentials onto mobile devices, PCs, servers, and/or other form factors. In another example, cardholder 110 may also use card services 150 to use a network-implemented rewards services platform that enables cardholders to redeem rewards on any transaction made with an enrolled payment account, and a network-implemented installments services platform that provides instant access to installment financing on existing or approved lines of credit.

Cardholder 110, issuer 120, acquirer 125, and/or merchant 130 may use account services 155, cryptocurrency services 160, and switching and clearing services 165 to use additional services that add value for cardholder 110, issuers 120, acquirers 125, and merchants 130. For example, the account services 155 may include one or more fraud evaluation services implemented by a safety and security services platform that provides to issuers 120 and/or acquirers 125 (and to merchants 130 accessing home payment network 102 through their acquirers 125), or directly to home network processor 112 on behalf of the issuers and/or acquirers and/or merchants that are members of home payment network 102 global-network-fraud detection service, for example. In another example, cryptocurrency services 160 may enable transfer of funds in cryptocurrency between individuals and/or entities. Cryptocurrency services 160 may also enable the exchange of fiat currency into cryptocurrency and vice versa, exchange of one type of cryptocurrency into another type, storing of private keys, managing of the user's crypto wallet, and other services relating to the cryptocurrency technology.

In yet another example, switching and clearing services 165 enables payment transaction 104 originating on off-network payment network 108 to be cleared.

As described in greater detail below, in another embodiment, the services provided by interface processor 140 and transfer process 135 are provided by the orchestration framework (Bridge App) which is configured to decode or decrypt second service request 109 to extract key data elements of the transaction associated with second service request 109 and nature of the transaction. In accordance with the nature of the transaction and the service contract rules with the value-added service provider of the value-added services, the orchestration framework or Bridge App may communicate with other value-added services computer systems with permissioned data elements required to provide the value-added service, where the value-added service may be similar to payment services computer system 107. By way of a non-limiting example, payment service computer system 107 and/or other value-added services computer systems may be hardware or virtual machines in a cloud network. Accordingly, the orchestration framework or Bridge App may be connected to multiple value-added services computer systems, each providing different value-added services. The orchestration framework or Bridge App may coordinate with one or more value-added services upon receiving second service request 109 based upon the nature of the transaction and the extracted key data elements. For example, some information or data needed to generate a response corresponding to second service request 109 may be available by invoking a first value-added service, and other information of data needed to generate the response corresponding to the second service request 109 may be available by invoking a second value-added service. Depending upon the required information or data to generate the response, the orchestration framework (Bridge App) interface processor 140 may simultaneously, near simultaneously, and/or sequentially invoke the first value-added service and the second value-added service. In this example, the first value-added service and the second value-added service do not specify an order in which these value-added services are invoked by the orchestration framework or Bridge App.

Figure 3:
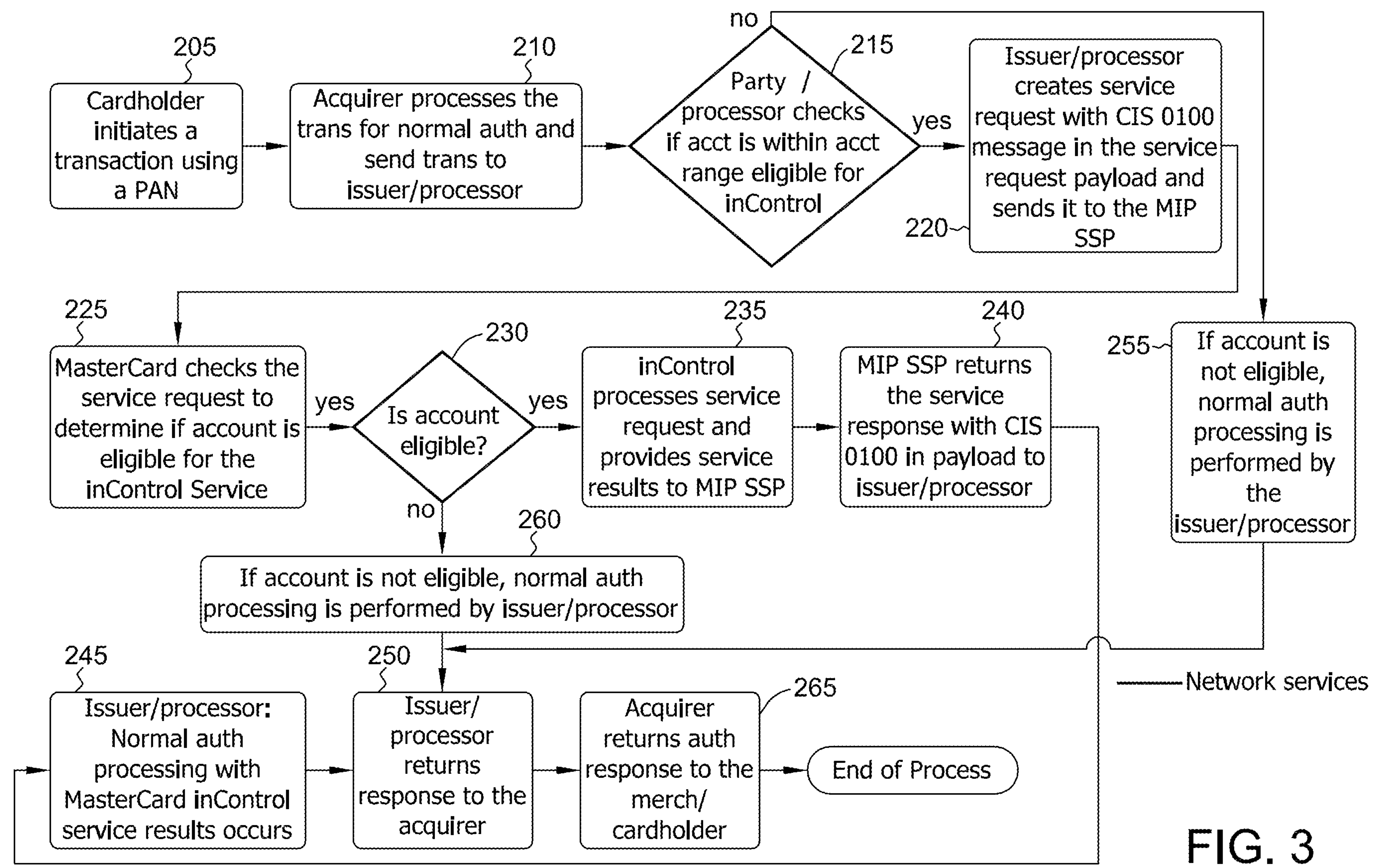
FIG. 3 is a flowchart illustrating an example method implemented by the payment services computer system shown in FIG. 2 for processing a home payment network payment transaction using off-network payment services.

FIG. 3 is a flowchart 200 illustrating an example method implemented by the payment services computer system shown in FIG. 2 for processing a home payment network payment transaction using off-network payment services. Cardholder 110 initiates 205 payment transaction 104 using an account identifier (e.g., a PAN). Acquirer 125 then processes payment transaction 104 for normal authorization and sends 210 payment transaction 104 to the requestor (e.g., home network processor 112, issuer 120, acquirer 125, merchant 130, a payment aggregator, a payment gateway, a government, a financial technology ("Fintech") system, or an account clearing house ("ACH") system). In the example embodiment, where the requestor is home network processor 112, acquirer 125 sends 210 payment transaction 104 to home network processor 112. In alternative embodiments, another party (e.g., issuer 120, acquirer 125, merchant 130, a payment aggregator, a payment gateway, a government, a financial technology ("Fintech") system, or an account clearing house ("ACH") system) is the requestor and acquirer 125 sends 210 payment transaction 104 to the other party. The requestor (e.g., home network processor 112 or other party) then checks 215 if the account is within the account range eligible for payment services 106 (e.g., a lookup or an API call). If the account is not eligible, normal authorization processing is performed 255 by issuer 120 and issuer 120 returns 250 a normal authorization response to acquirer 125 and acquirer 125 returns 265 the authorization response to merchant 130 and cardholder 110 without any additional services being provided with respect to the transaction. If, however, the account is eligible for payment services 106, the requestor sends 220 a service request message (e.g., second service request 109 converted from first service request 111 using transfer process 135) to interface processor 140. Interface processor 140 sends (not shown) second service request 109 to payment services platform 145. Payment services platform 145 checks 225 second service request 109 to determine if the account is eligible for payment services 106 or other value-added services. If the account is not eligible 230, normal authorization processing is performed 260 by issuer 120 and issuer 120 returns a normal authorization response 250 to acquirer

125 and acquirer 125 returns 265 the authorization response to merchant 130 and cardholder 110. If the account is eligible 230 for payment services 106 (or other value-added services), payment services platform 145 (or other value-added services platform) processes second service request 109 and generates 235 a first services response 113. Payment services response also provides 235 first services response 113 to interface processor 140. Interface processor 140 returns 240 off-network service response 113 to the requestor. In returning 240 first services response 113, first services response 113 is converted to second services response 114 using transfer process 135. Issuer 120 executes normal authorization with payment services 245. The requestor then returns 250 the authorization response to acquirer 125 and acquirer 125 returns 265 the authorization response to merchant 130 and cardholder 110.

As described in greater detail below, in another embodiment that includes the orchestration framework or Bridge App, if the cardholder account is eligible for payment services 106, the requestor may send 220 a service request message (e.g., second service request 109) to the Bridge App. The orchestration framework (Bridge App) decompresses the message and decodes it to extract key data elements of the transaction associated with second service request 109 and the nature of the transaction. In accordance with the nature of the transaction and the service contract with the particular value-added service, the orchestration framework or Bridge App communicates with other value-added services computer systems that may be similar to payment services computer system 107 using a subset (e.g., permissioned data based on the service contract rules) of the extracted key data element, as required by the value-added service to provide the required service. By way of a non-limiting example, payment service computer system 107 and/or other value-added services computer systems may be hardware or virtual machines in a cloud network. Accordingly, the orchestration framework or Bridge App may be connected to multiple value-added services computer systems, each providing different value-added services. The orchestration framework or Bridge App may coordinate with one or more value-added services upon receiving second service request 109 based upon the nature of the transaction and the extracted key data elements. For example, some information or data needed to generate a response corresponding to second service request 109 may be available by invoking a first value-added service, and other information of data needed to generate the response corresponding to the second service request 109 may be available by invoking a second value-added service. Depending upon the required information or data to generate the response, the orchestration framework (Bridge App) may simultaneously, near simultaneously, and/or sequentially invoke the first value-added service and the second value-added service. In this example, the first value-added service and the second value-added service do not specify an order in which these value-added services are invoked by the orchestration framework or Bridge App.

Figure 4:
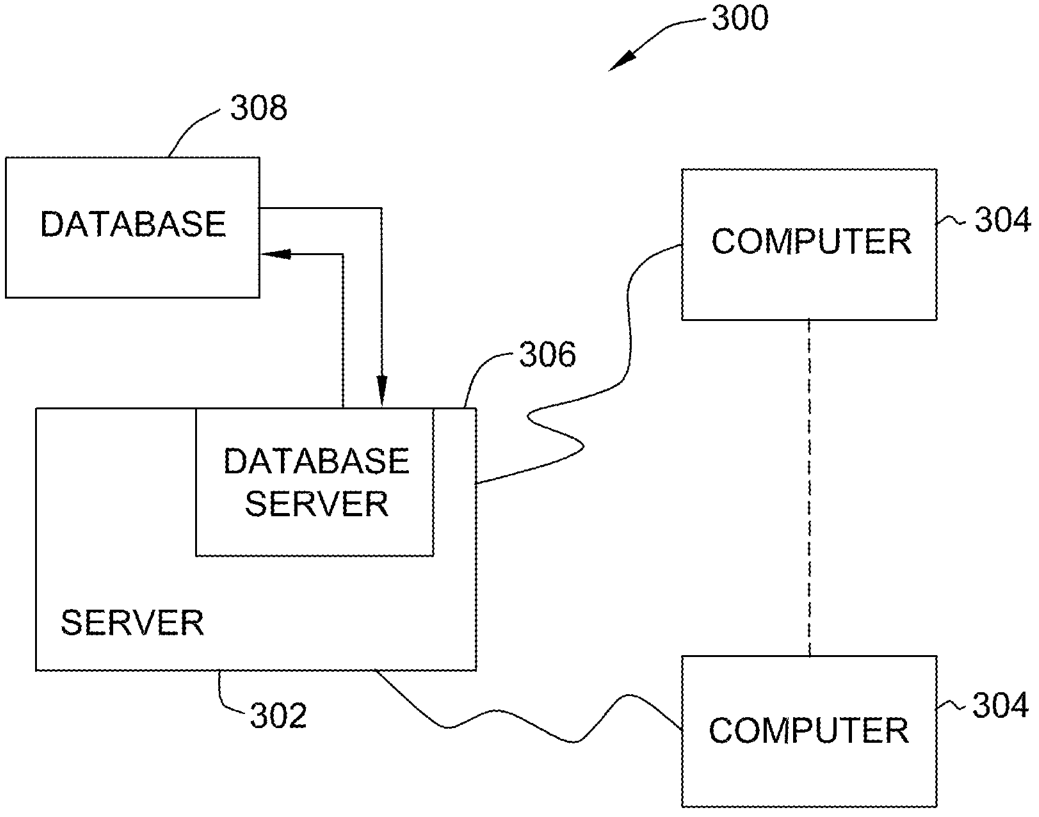
FIG. 4 is a simplified block diagram of an example computer system representative of the payment services platform in the payment processing environment shown in FIG. 2.

FIG. 4 is a simplified block diagram of an example computer system 300 representative of payment services platform 145 in payment processing environment 100 (both shown in FIG. 2). In the example embodiment, system 300 includes a server system 302 and a plurality of client subsystems, also referred to as client systems 304, connected to server system 302. In one embodiment, client systems 304 are computers including a web browser, such that server system 302 is accessible to client systems 304 using the Internet. Client systems 304 are interconnected to the Internet through many interfaces including a network, such as a local area network (LAN) and/or a wide area network (WAN), dial-in connections, cable modems, wireless-connections, and special high-speed ISDN lines. Client systems 304 may be any device capable of interconnecting to the Internet including a web-based phone, personal digital assistant (PDA), or other web-connectable equipment. A database server 306 is connected to a database 308 containing information on a variety of matters, as described below in greater detail. In one embodiment, database 308 is stored on server system 302 and may be accessed by potential users at one of client systems 304 by logging onto server system 302 through one of client systems 304. In any alternative embodiment, database 308 is stored remotely from server system 302 and may be non-centralized.

As discussed below, payment card information including account numbers, payment card numbers, expiration dates, and account statuses, such as whether the account is open or closed, is stored within database 308. Further, data relating to the cardholder of a payment card may also be stored within database 308. Such cardholder data may include, for example, cardholder name and cardholder billing address.

Figure 5:
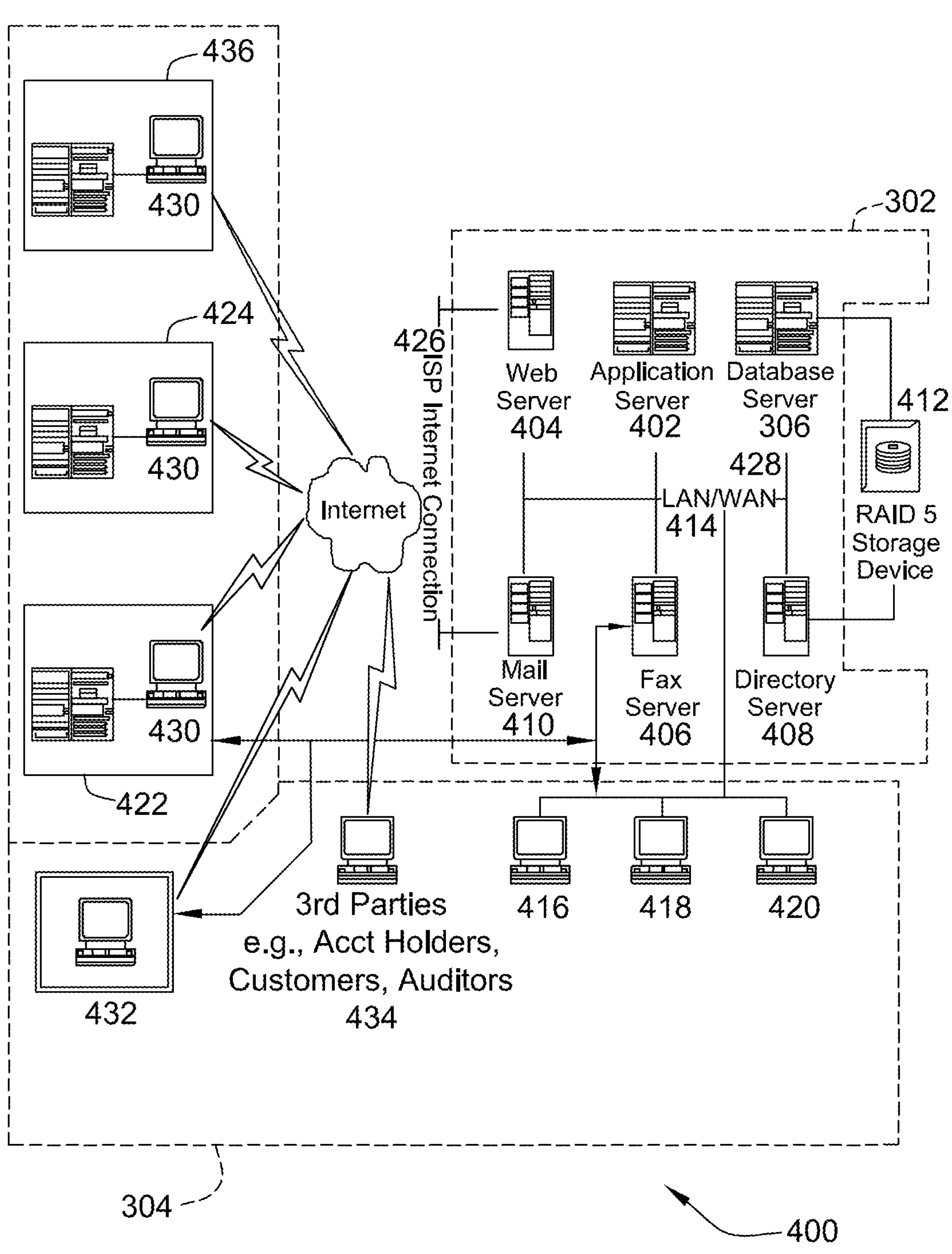
FIG. 5 is an expanded block diagram of an example embodiment of a server architecture of the payment services computer system shown in FIG. 2.

FIG. 5 is an expanded block diagram of an example embodiment of a server architecture of system 400 in accordance with one embodiment of the present disclosure. Components in system 400, identical to components of system 300 (shown in FIG. 4), are identified in FIG. 5 using the same reference numerals used in FIG. 4. System 400 includes server system 302 and client systems 304. Server system 302 further includes database server 306, an application server 402, a web server 404, a fax server 406, a directory server 408, and a mail server 410. A disk storage unit 412 is coupled to database server 306 and directory server 408. Servers 306, 402, 404, 406, 408, and 410 are coupled in a local area network (LAN) 414. In addition, a system administrator's workstation 416, a user workstation 418, and a supervisor's workstation 420 are coupled to LAN 414. Alternatively, workstations 416, 418, and 420 are coupled to LAN 414 using an Internet link or are connected through an Intranet.

Each workstation, 416, 418, and 420, is a personal computer having a web browser. Although the functions performed at the workstations typically are illustrated as being performed at respective workstations 416, 418, and 420, such functions can be performed at one of many personal computers coupled to LAN 414. Workstations 416, 418, and 420 are illustrated as being associated with separate functions only to facilitate an understanding of the different types of functions that can be performed by individuals having access to LAN 414.

Server system 302 is configured to be communicatively coupled to various entities, including acquirers 422 and issuers 424, and to third parties 434, e.g., auditors or customers using an Internet connection 426 or a "direct services access" (DSA) framework that may implemented as a Mastercard® inControl™ platform ("MIP"), shown in FIG. 2. In some embodiments, third-parties 434 may include processors, payment aggregators, payment gateways, governments, fintechs, Account Clearing House (ACH). Server system 302 may also be communicatively coupled with a merchant 436. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 428, local area network 414 could be used in place of WAN 428.

In the example embodiment, any authorized individual or entity having a workstation 430 may access system 400. At least one of the client systems includes a manager workstation 432 located at a remote location. Workstations 430 and 432 include personal computers having a web browser. Also, workstations 430 and 432 are configured to communicate with server system 302. Furthermore, fax server 406 communicates with remotely located client systems, including a client system 432, using a telephone link. Fax server 406 is configured to communicate with other client systems 416, 418, and 420 as well.

Figure 6:
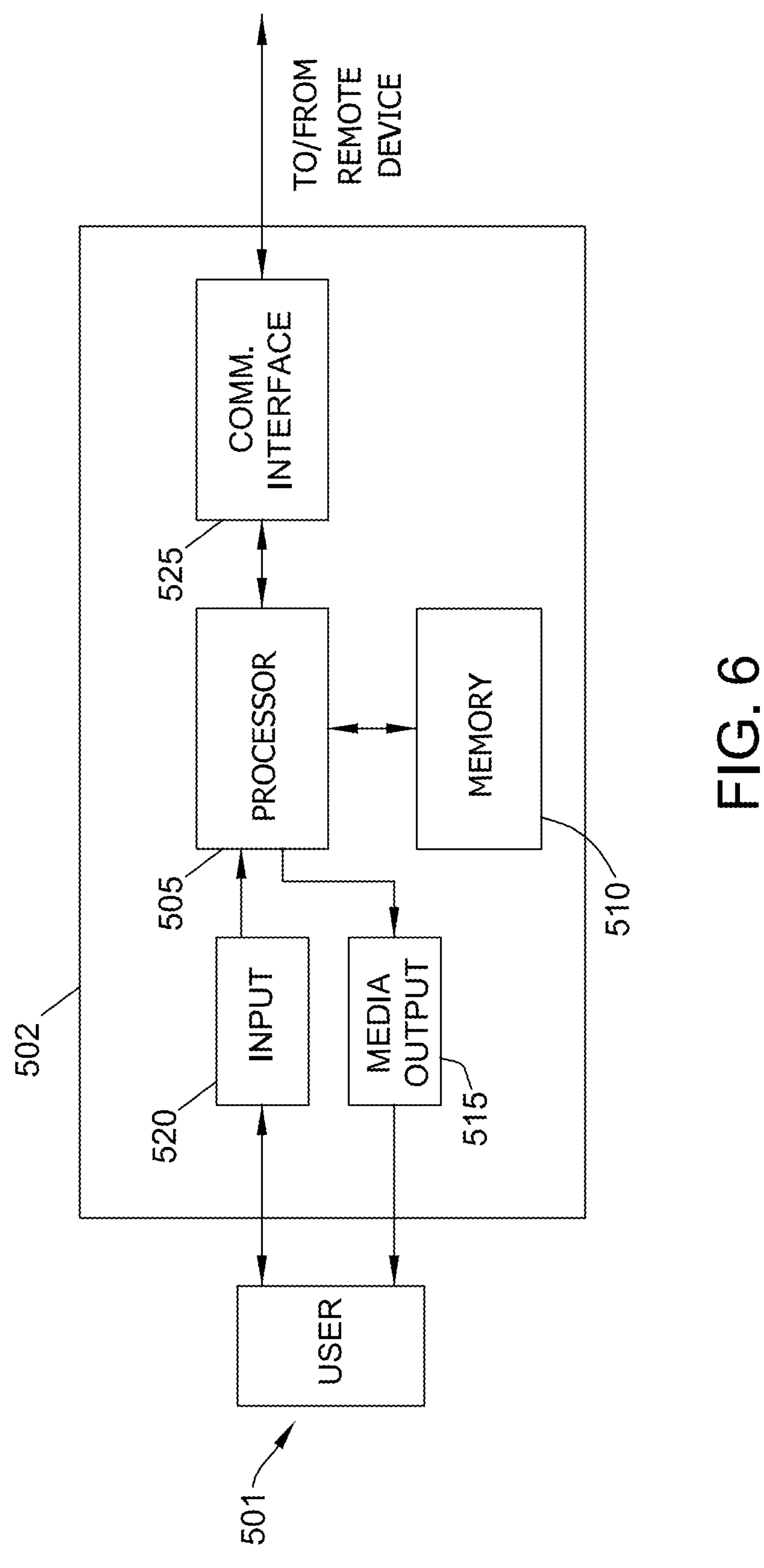
FIG. 6 illustrates an example configuration of a cardholder computer device operated by a cardholder shown in FIGS. 4 and 5.

FIG. 6 illustrates an example configuration of a cardholder computer device 502 operated by a cardholder 501. Cardholder computer device 502 may include, but is not limited to, client systems 304, 416, 418, and 420, workstation 430, and manager workstation 432 (shown in FIG. 5).

Cardholder computer device 502 includes a processor 505 for executing instructions. In some embodiments, executable instructions are stored in a memory area 510. Processor 505 may include one or more processing units (e.g., in a multi-core configuration). Memory area 510 is any device allowing information such as executable instructions and/or other data to be stored and retrieved. Memory area 510 may include one or more computer readable media.

Cardholder computer device 502 also includes at least one media output component 515 for presenting information to cardholder 501. Media output component 515 is any component capable of conveying information to cardholder 501. In some embodiments, media output component 515 includes an output adapter such as a video adapter and/or an audio adapter. An output adapter is operatively coupled to processor 505 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, cardholder computer device 502 includes an input device 520 for receiving input from cardholder 501. Input device 520 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 515 and input device 520.

Cardholder computer device 502 may also include a communication interface 525, which is communicatively couplable to a remote device such as server system 302 or a web server operated by a merchant. Communication interface 525 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 510 are, for example, computer readable instructions for providing a user interface to cardholder 501 via media output component 515 and, optionally, receiving and processing input from input device 520. A user interface may include, among other possibilities, a web browser and client application. Web browsers enable cardholders, such as cardholder 501, to display and interact with media and other information typically embedded on a web page or a website from server system 302 or a web server associated with a merchant. A client application allows cardholder 501 to interact with a server application from server system 302 or a web server associated with a merchant.

Figure 7:
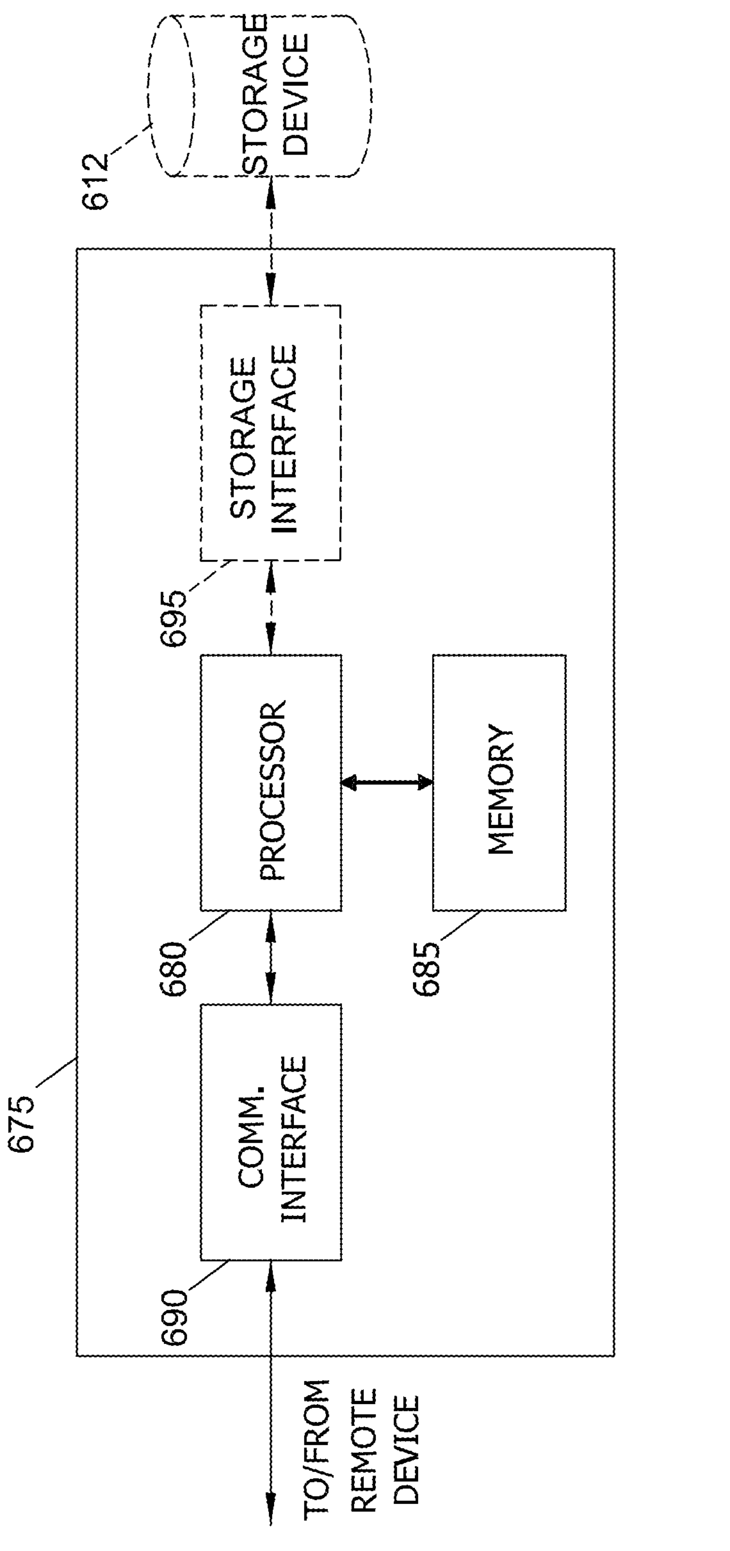
FIG. 7 illustrates an example configuration of the server computer device shown in FIGS. 4 and 5.

FIG. 7 illustrates an example configuration of a server computer device 675 such as server system 302 (shown in FIGS. 4 and 5). Server computer device 675 may include, but is not limited to, database server 306, application server 402, web server 404, fax server 406, directory server 408, and mail server 410 (shown in FIGS. 4 and 5).

Server computer device 675 includes a processor 680 for executing instructions. Instructions may be stored in a memory area 685, for example. Processor 680 may include one or more processing units (e.g., in a multi-core configuration).

Processor 680 is operatively coupled to a communication interface 690 such that server computer device 675 is capable of communicating with a remote device such as cardholder computer device 502 (shown in FIG. 6) or another server computer device 675. For example, communication interface 690 may receive requests from client systems 304 via the Internet, as illustrated in FIGS. 4 and 5.

Processor 680 may also be operatively coupled to a storage device 612 similar to storage device 412 (shown in FIG. 5). Storage device 612 is any computer-operated hardware suitable for storing and/or retrieving data. In some embodiments, storage device 612 is integrated in server computer device 675. For example, server computer device 675 may include one or more hard disk drives as storage device 612. In other embodiments, storage device 612 is external to server computer device 675 and may be accessed by a plurality of server computer devices 675. For example, storage device 612 may include multiple storage units such as hard disks or solid state disks in a redundant array of inexpensive disks (RAID) configuration. Storage device 612 may include a storage area network (SAN) and/or a network attached storage (NAS) system.

In some embodiments, processor 680 is operatively coupled to storage device 612 via a storage interface 695. Storage interface 695 is any component capable of providing processor 680 with access to storage device 612. Storage interface 695 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 680 with access to storage device 612.

Memory area 685 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only and are thus not limiting as to the types of memory usable for storage of a computer program.

FIG. 8 illustrates an example configuration of a network services bridge computing system 800 including a "direct services access" (DSA) framework 840 and an API gateway 845. In particular, network services bridge computing system 800 incorporates and extends upon payment processing environment 100 (shown in FIG. 2), and like components are numbered accordingly. Moreover, DSA framework 840 is another example embodiment of interface processor 140 (shown in FIG. 2) described above, with additional functionality as described in more detail below. Eleven different examples of home payment networks 102, designated 102A, 102B, 102C, 102D, 102E, 102F, 102G, 102H, 102I, 102J, and 102K are also illustrated in FIG. 8.

With reference to FIGS. 2 and 8, in the example embodiment, in addition or alternatively to the services 150, 155, 160, and 165 described above, services 106 include one or more of services 162, 164, 166, and 168 as described below. Those of ordinary skill in the art will understand how services 162, 164, 166, and 168 hosted by off-network payment network 108 are conventionally implemented for transactions originating on that same payment network 108, and accordingly the description of services 162, 164, 166, and 168 provided below is to provide an overview.

More specifically, card services 150 include cardholder value-added services, such as services 162, 164, and 166. In particular, service 162 is a digital enablement services platform 162 for management, generation, and provisioning of digital payment credentials onto mobile devices, PCs, servers, and/or other form factors. For example, but not by way of limitation, digital enablement services platform 162 links or replaces consumer account credentials stored on traditional payment cards with digital payment credentials provisioned into mobile devices via Secure Element or Host Card Emulation technologies, enabling the consumer's mobile device to perform payments through existing contactless point-of-sale (POS) systems and through new remote payment methods, such as in-app payments or browser payments. For another example, digital enablement services platform 162 supports merchants or commerce platforms that want to tokenize their stored cards-on-file (e.g., to improve security of stored consumer account information), by providing detokenization and dynamic data or cryptography validation for one or more of near field communication (NFC) contactless payments, dynamic magnetic stripe data payments, digital secure remote payments (including in-app, browser, and card-on-file), and dynamic token verification codes.

Service 164 is a network-implemented rewards services platform 164 that enables cardholders to redeem rewards on any transaction made with an enrolled payment account. In particular, network-implemented rewards services platform 164 connects to any points-based loyalty program, e.g., various rewards programs offered by merchants 130 or issuers 120, without requiring direct integration with the merchant POS. Cardholders pay the merchant 130 fully for the cost of the transaction and receive a rebate via network-implemented rewards services platform 164 to cover the cost of the purchase. The rebate causes points to be deducted from the cardholder's rewards account. In some embodiments, network-implemented rewards services platform 164 offers flexible program parameters for merchants 130 or issuers 120 to configure their rewards programs, including cost per point, purchase thresholds, and merchant-specific promotions.

Service 166 is a network-implemented installments services platform 166 that provides instant access to installment financing on existing or approved lines of credit. In some embodiments, installments services platform 166 offers two options to consumers: pre-purchase and post-purchase installments. In the pre-purchase use case, prior to shopping, card-holders opt-in to automatic installments for purchases at consumer-selected outlets. Cardholders define the installment preference upfront via the issuer's 120 chosen communication channel and the shopping experience through the merchant 130 remains unaltered. In the post-purchase use case, cardholders receive a notification immediately after making a purchase using their payment account. The merchant 130 receives the full price of the transaction per the usual clearing and settlement of the payment card transaction, and off-network payment network 108 implements the installment financing with the consumer and issuer via installments services platform 166.

In addition to cardholder value-added services, services 106 may also include additional services that add value for issuers 120, acquirers 125, and merchants 130. For example, account services 155 includes service 168, which is one or more fraud evaluation services implemented by a safety and security services platform 168 that provides to issuers and/or acquirers (and to merchants accessing home payment network 102 through their acquirers 125), or directly to home network processor 112 on behalf of the issuers and/or acquirers and/or merchants that are members of home payment network 102.

In some embodiments, the fraud evaluation services 168 include a global-network-fraud detection service that continuously monitors all transactions occurring on network 108 in real-time for a number of types of large-scale payment account fraud attacks as they occur, including BIN attacks, CNP (card-not-present) attacks, System Failure, ATM attacks, POS (point-of-sale) attacks, authorization anomalies, and the like. The global-network-fraud detection service implemented via safety and security services platform 168 provides a turnkey solution to help issuers limit their losses from large-scale fraud by acting as a second layer of defense that steps in when an issuer is unable to defend against a large-scale attack due to an issuer system breach or other unforeseen events. Safety and security services platform 168 returns codes in first services response 113 recommending a transaction decline (or prompting/causing a transaction decline) in the event that parameters of the transaction suggest a connection to an active large-scale fraud event detected by the global-network-fraud detection service.

Additionally, or alternatively, the fraud evaluation services 168 include a decision-intelligence service that applies machine-learning algorithms, trained using historical data acquired through transactions processed by off-network payment network 108 over a long period of time, to each current transaction to provide detailed insights useful to help issuers 120 make more informed transaction authorization decisions where some more nuanced indicia of fraud are present. Via the machine-learning algorithms, the decision-intelligence service implemented via safety and security services platform 168 effectively applies thousands of data points to each transaction, and provides the insights encoded in first services response 113 as one or more concise reason codes for issuers 120 to leverage in their authorization decisions. For just a few examples, the reason codes may report details such as that the transaction represents an abnormally high frequency of transactions at merchants having the same merchant category code (MCC); a high cumulative withdrawal amount on international ATM; or a suspicious gambling-related activity.

Additionally, or alternatively, the fraud evaluation services 168 include a fraud rules management service that enables issuers 120 to rapidly implement and deploy their own predictive fraud rules. The fraud rules management service implemented via safety and security services platform 168 enables issuers to create, maintain, and enhance fraud rules at the payment-network enterprise level, enabling quick definition and implementation of predictive fraud rules that can help to reduce the issuer's 120 fraud losses.

Additionally or alternatively, the fraud evaluation services include an authentication-insights service implemented via safety and security services platform 168 that leverages authentication data, such as consumer device identifier and consumer device location, obtained by a merchant website during online consumer activity to create transaction-level risk assessments that can be provided, via codes embedded in first services responses 113, to issuers 120 in real-time for consideration during authorization. The authentication data may be obtained, for example, from a directory server hosted by off-network payment network 108 that participates in consumer authentication protocols such as the 3DS Protocols owned and updated by EMVCo.

Additionally or alternatively, the fraud evaluation services include an accountholder authentication value (AAV) service implemented via safety and security services platform 168 that verifies, via a code embedded in first services response 113, that a transaction submitted for authorization was previously authenticated for the same payment account number, merchant, and transaction amount, for example to provide assurance to the issuer sufficient for the issuer to forego chargeback rights. Again, the authentication data may be obtained, for example, from a directory server hosted by off-network payment network 108 that participates in consumer authentication protocols such as the 3DS Protocols owned and updated by EMVCo.

In some embodiments, each of digital enablement services platform 162, network-implemented rewards services platform 164, network-implemented installments services platform 166, and safety and security services platform 168 is implemented using a server architecture such as one or more server computer devices 675 (shown in FIG. 7). Alternatively, each of digital enablement services platform 162, network-implemented rewards services platform 164, network-implemented installments services platform 166, and safety and security services platform 168 is implemented in any suitable fashion that enables digital enablement services platform 162, network-implemented rewards services platform 164, network-implemented installments services platform 166, and safety and security services platform 168 to function as described herein.

As noted above, DSA framework 840 is another example embodiment of interface processor 140 and incorporates similar functionality to that described above for interface processor 140. In particular, DSA framework 840 is programmed to communicate with transfer process 135 implemented by one or more computing devices on home payment network 102, as shown in FIG. 2. As discussed above, transfer process 135 is programmed to convert a first data file format associated with home payment network 102 (e.g., first service request 111) to a second data file format associated with off-network payment network 108, as shown in FIG. 2, and also to perform the reverse conversion (e.g., first services response 113 to second services response 114), as shown in FIG. 2. More specifically, as discussed above, each of home payment network 102 and off-network payment network 108 implements its own set of proprietary communications standards for the exchange of financial transaction data and the settlement of funds between financial institutions that are members of the respective payment network. Transfer process 135 is programmed to convert messages (e.g., first service request 111) formatted according to the proprietary standard used by home payment network 102 into messages (e.g., second service request 109) formatted according to the proprietary standard used by off-network payment network 108 and to include only data elements permissioned by or based upon the service contract stored in memory for each service provided by off-network payment network 108 such that only permissioned data is provided for each service being provided, and also to perform the reverse conversion (e.g., first services response 113 to second services response 114), as shown in FIG. 2.

In some embodiments, transfer process 135 is implemented as part of a local message handling infrastructure/gateway application for access to home network 102, executable at one or more of issuer 120, acquirer 125, a payment aggregator/payment gateway 850, an account clearing house ("ACH") system 855, a bank 860, a financial technology ("Fintech") system 865, a processor 870, a government 875, and/or home network processor or "switch" 112 on home payment network 102 using DSA framework 840. One example of such a message handling infrastructure/gateway application for access to home network 102 is the Mastercard® Interface Processor ("MIP"), which provides a gateway to, and message handling infrastructure for communications on, the Mastercard® payment network. Alternatively, transfer process 135 is implemented at one or more of issuer 120, acquirer 125, payment aggregator/payment gateway 850, ACH system 855, bank 860, Fintech system 865, processor 870, government 875, and/or home network processor or "switch" 112 in any suitable fashion that enables network services bridge computing system 800 to function as described herein.

Those of skill in the art will appreciate that such proprietary communications standards used by each payment network 102A, 102B, 102C, 102D, 102E, 102F, 102G, 102H, 102I, 102J, 102K, and 108 may be variations of a standardized format, such as ISO 8583 or ISO 20022 compliant messages. As used herein, "ISO" refers to a series of standards approved by the International Organization for Standardization (ISO is a registered trademark of the International Organization for Standardization of Geneva, Switzerland). The ISO 8583 and ISO 20022 standard defines acceptable message types, data element locations, and data element values. In addition, the ISO 8583 standard reserves several data element locations for private use. In the example embodiment, off-network payment network 108 recognizes values in certain reserved data elements of its proprietary messaging format as requests for (and/or parameters associated with) one or more of services 150, 155, 160, and 165. Acquirers 125 and issuers 120 operating on off-network payment network 108 are pre-programmed to include the values for such requests and parameters in the data element locations recognized by switch 147, such that service requests originating on off-network payment network 108 are automatically routed to the proper service platforms. Similarly, off-network payment network 108 fills in values in certain other reserved data elements of its proprietary messaging format to provide service responses from the requested one or more services 150, 155, 160, and 165, and acquirers 125 and issuers 120 operating on off-network payment network 108 are pre-programmed to extract the service response values from the data element locations in the messages routed back from the service platform(s) by switch 147. In contrast, each home network 102A, 102B, 102C, 102D, 102E, 102F, 102G, 102H, 102I, 102J, and 102K may already have different designated uses for those reserved data elements in their respective implementations of the proprietary messaging format; however, they may be able to accommodate service request indicators and parameters, and return service responses, in other reserved data element locations for messages routed through their respective switches 112. Accordingly, transfer process 135 as implemented on each home network 102A, 102B, 102C, 102D, 102E, 102F, 102G, 102H, 102I, 102J, and 102K is configured to convert messages received in the proprietary format used by the respective home network 102 (as generated in the normal course by acquirers 125 and issuers 120 operating on that home payment network 102) into the proprietary format used by off-network payment network 108. An alternative approach implemented by API gateway 845 will be discussed in more detail below.

In the example embodiment, messages converted by transfer process 135 are automatically routed to a designated "direct services access" (DSA) port 149 on switch 147 of off-network payment network 108. Switch 147 is programmed to route messages received at DSA port 149 to DSA framework 840 for handling of service requests. Because messages received through DSA port 149 have already been converted to the proprietary messaging format recognized by off-network payment network 108 and include only those permissioned data elements based upon the corresponding service contract between the off-network payment network 108 and the home network 102, the service requests can be handled immediately by the service platforms, and the service responses are returned, in the proprietary format used by off-network payment network 108, in near real-time back through DSA framework 840 and switch 147 to the originating transfer process 135. Transfer process 135 performs the reverse conversion to the proprietary format used by the respective home network 102 and provides the converted service response to the requesting issuer 120, acquirer 125, payment aggregator/payment gateway 850, ACH system 855, bank 860, Fintech system 865, processor 870, government 875, and/or home network processor or "switch" 112 on home network 102 for immediate use by the requesting party. By only providing permissioned data to the service providers, the transfer process 135 provides improved data security by not exposing the transfer of unnecessary data. Rather, only the data needed to provide the service is transfer. This functionality helps to provide improved data security, faster processing times because only necessary data is transmitted and not all the data, and less computer resources including network bandwidth are required to process this limited data package. Home networks 102A, 102B, 102C, 102G, 102H, 102J, and 102K are illustrations of payment networks that use home network processor 112 (also referred to as switch 112) to route communications (that are formatted according to the proprietary communications format promulgated by respective home network 102A, 102B, 102C, 102G, 102H, 102J, and 102K) between acquirers 125 and issuers 120 that are members of respective home network 102A, 102B, 102C, 102G, 102H, 102J, and 102K. In other words, switch 112 provides a connection between acquirers 125 and issuers 120 that are separate institutions. As illustrated, each of acquirers 125, issuers 120, and switch 112 on home networks 102A, 102B, 102C, 102G, 102H, 102J, and 102K may implement transfer process 135 locally to gain access to services 106 via off-network payment network switch 147 and DSA framework 840. Acquirers 125 provide a gateway onto home network 102B for merchant 835 (similar to merchant 130 on FIG. 2), onto home network 102G for Fintech system 865, onto home network 102H for processor 870, and onto home network 102K for government 875. Thus, in this architecture, merchant 835, Fintech system 865, processor 870, and government 875 may gain the benefit of services 106 only by arranging for such services through their respective acquirer 125.

Home network 102D is an illustration of a payment network that uses a payment aggregator/payment gateway 850 to route communications (that are formatted according to the proprietary communications format promulgated by home network 102D) between issuers 120 and merchants 835 that are members of the home network 102D. In other words, payment aggregator/payment gateway 850 provides a connection between issuers 120 and merchants 835. As illustrated, each of issuers 120, merchants 835, and payment aggregator/payment gateways 850 on home network 102D may implement transfer process 135 locally to gain access to services 106 via off-network payment network switch 147 and DSA framework 840.

Home networks 102E and 102F are illustrations of payment networks that use an ACH system 855 to route communications (that are formatted according to the proprietary communications format promulgated by home networks 102E and 102F) between banks 860 that are members of the home networks 102E and 102F. In other words, ACH system 855 provides a connection between banks 860 that are separate institutions. As illustrated, each of banks 860 and ACH systems 855 on home networks 102E and 102F may implement transfer process 135 locally to gain access to services 106 via off-network payment network switch 147 and DSA framework 840.

Home network 102I is an illustration of an "on us" payment network. More specifically, in home network 102I, the functions of acquirer 125 and issuer 120 are performed by the same institution, and accordingly home network 102I does not include a switch to route communications between acquirers 125 and issuers 120. As illustrated, institutions functioning as acquirers 125/issuers 120 on home network 102I may implement transfer process 135 locally as part of either acquirer functionality or issuer functionality to gain access to services 106 via off-network payment network switch 147 and DSA framework 840. Acquirer functionality provides a gateway onto home network 102I for merchant 835 (similar to merchant 130 on FIG. 2), Fintech system 865, processor 870, and government 875. Thus, in this architecture, merchant 835, Fintech system 865, processor 870, and government 875 may gain the benefit of services 106 only by arranging for such services through their respective acquirer 125.

Network services bridge computing system 800 also provides an alternative architecture by which participants on certain home networks 102 (e.g., home networks 102A, 102B, 102C, 102D, 102E, 102F, 102G, 102H, 102I, 102J, and 102K) may access services 106 via an API gateway 845 to DSA platform 840. In particular, in addition or alternatively to DSA platform 840 receiving services requests 109 via DSA port 149 of switch 147, DSA platform 840 is also programmed to receive services requests 809 for services 106 via a Direct Services Access (DSA) application programming interface (API) provided by API gateway 845. The API defines a plurality of parameters that generally correspond to the plurality of data fields of the proprietary communications standard handled by transfer process 135.

In the example embodiment, the DSA API provides access to services 106 via remote procedure call (RPC)-style stateless web services, wherein each operation to be performed is represented by an API endpoint. In some embodiments, the DSA API uniform resource locator (URL) format is as follows:

| URL Element | Definition |
|---|---|
| scheme | https |
| host[:port] | Hostname (and port number if required) for the host domain (e.g., api.servicesnetwork.com) |
| contextRoot | /Direct-Service-API/Services |
| Method | Post |

In the example embodiment, the DSA API is accessible via hypertext transfer protocol (HTTP), and each endpoint in the API specifies the HTTP Method (e.g., "Post") used to access it. API gateway 845 receives services requests 809 formatted according to the HTTP Method and including payloads specifying values for the relevant parameters, or permissioned data elements and their values, e.g., account identifier, requestor identifier, authorization process details, etc., of the underlying authorization process being performed on any home networks 102. API gateway 845 then communicates the parameters to DSA platform 840, which communicates with the services 106 to obtain service results and passes the results back to API gateway 845. Similarly, API gateway 845 returns services responses 813 formatted according to the HTTP Method and including payloads specifying the values returned by the applicable services 106. In the example embodiment, the payloads for services requests 809 and services responses 813 are sent in the JavaScript Object Notation (JSON) data-interchange format. For example, DSA API request parameters corresponding to the account identifier and requestor identifier(s) may be specified as follows:

| API Request Parameter | Corresponding data element in an equivalent ISO 8583-formatted services request 109 | Description |
|---|---|---|
| card.accountNumber | DE002 | The number that is embossed or encoded (or both) on a payment card corresponding to the account for which the authorization process on home network 102 is being conducted; identifies both the issuer and the particular cardholder account |
| cardacceptor.acquirerID | DE032 | Acquiring institution identification code |
| cardAcceptor.terminalID | DE041 | Merchant terminal identification code |

Alternatively, the DSA API is implemented using any suitable protocol and data-interchange format.

In the example embodiment, the requestor (e.g., home network processor or "switch" 112, issuer 120, acquirer 125, merchant 835, payment aggregator/payment gateway 850, ACH 855, Fintech 865, or government 875) accesses the DSA API via a local cloud interface 880. For example, cloud interface 880 may be provided by a subscription to a public cloud service such as Amazon® Web Service (AWS) or Microsoft® Azure. In some embodiments, the use of cloud interface 880 provides technical advantages to requestors in implementing connectivity to the DSA API, due to pre-existing cloud interface features such as encryption protocols (e.g., Transport Layer Security (TLS) using Secure Sockets Layer (SSL)) that keep data secure during transport between the requestor and DSA platform 840. Additionally, or alternatively, code development to implement connectivity to the DSA API through cloud interface 880 may be significantly less resource-intensive as compared to implementing transfer process 135 within the confines of the message handling infrastructure/gateway application for access to home networks 102. Moreover, in certain embodiments, merchants 835 with cloud connectivity may use cloud interface 880 to access certain services 106 directly. Alternatively, each requestor implements connectivity to the DSA API using any suitable interface.

In certain embodiments, DSA platform 840 automatically applies eligible services associated with one or more identifiers included in the services request message 109 or 809. For example, when a requestor on one of home networks 102 registers with off-network payment network 108 for access to one or more services 106, a record is stored in a registered services database 170 (shown inn FIG. 2) accessible by DSA platform 840. The record associates a requestor identifier with the one or more services 106 for which the requestor is registered. For example, the requestor may be one of the acquirers 125 and issuers 120 that are members of home payment network 102, one of the payment aggregator/payment gateway 850, ACH system 855, Fintech system 865, processor 870, and/or government 875 that are members of home payment network 102, or home network processor or "switch" 112 that registers for the service directly, enabling it to provide service results to its issuers, acquirers, merchants, and/or other requestors for the results. For example, each requestor identifier may be a unique numeric or alphanumeric code. For example, the requestor identifier may be a merchant identifier associated with a merchant 835, a bank identification number (BIN) associated with an issuer 120, an acquirer identifier associated with acquirer 125, or a payment network identifier associated with home payment network 102.

After registration, each service request 109 and/or 809 transmitted to DSA platform 840 by the requestor includes the requestor identifier. DSA platform 840 queries registered services database 170 for records including the requestor identifier, and the query returns the one or more services for which the requestor has registered. DSA platform 840 automatically extracts the parameters associated with each registered service from the service request 109 and/or 809, and automatically routes each request and associated parameters to one or more of the service platforms 150, 155, 160, and 165 corresponding to the one or more services for which the requestor has registered.

Similarly, when a cardholder 22 (shown in FIG. 1) of a payment account registers with off-network payment network 108 for access to one or more services 106, a record is stored in a registered services database 170. The record associates an account identifier with the one or more services 106 for which the account is registered. For example, each account identifier may be a unique numeric or alphanumeric code. For example, the account identifier may be, or may be a token or virtual account number linked to, a primary account number (PAN) associated with the account.

With respect to some services, the record stored in registered services database 170 may include additional fields that store information specific to the requestor identifier or account identifier and the particular service. As one example, for an account identifier registered with cardholder-defined rules service 160, the specific rules and limits selected by the cardholder (as discussed above) may also be stored in (or linked to) the record that associates the account identifier and the service. Additionally, or alternatively, the services platform that implements service 160 may store and access the information specific to the requestor identifier or account identifier and the particular service in a separate database.

Each service request 109 and/or 809 transmitted to DSA platform 840 by a requestor includes the account identifier used for the underlying transaction. DSA platform 840 queries registered services database 170 for records including the account identifier, and the query returns the one or more services for which the account has been registered. DSA platform 840 automatically extracts the parameters associated with each registered service from the service request 109 and/or 809, and automatically routes each request and associated parameters to one or more of the service platforms 150, 155, 160, and 165 corresponding to the one or more services for which the account has been registered.

In some embodiments, network services bridge computing system 800 provides an improvement to the performance of home payment networks 102, in that each home payment network 102 does not need to devote data storage resources and processing resources to track, and/or to include in each service request 109 and/or 809, a list of every off-network service for which each cardholder, acquirer 125, issuer 120, merchant 835, aggregator/payment gateway 850, ACH system 855, Fintech system 865, processor 870, government 87, and/or "switch" 112 has registered in order to obtain the appropriate service response 113 or 813. Instead, DSA platform 840 more efficiently tracks registered services for each requestor across all home networks 102 in a central location (e.g., registered services database 170) local to DSA platform 840.

Alternatively, registered services for each requestor and/or cardholder are tracked in any suitable fashion that enables network services bridge computing system 800 to function as described herein.

In certain embodiments, DSA platform 840 accepts, in a single services request message 109 or 809, requests for multiple services 106 associated with a single authorization process on one of home payment networks 102 and returns responses for the multiple requested services in a single services response message 113 or 813. For example, the requestor may be registered for multiple services, the account may be registered for multiple services, and/or the multiple services may include at least one service for which the requestor has registered and at least one service for which the account has been registered.

As shown in FIG. 8, while each requestor may be able to connect to the DSA API gateway 845 using any suitable interface for subsequently communicating with the DSA platform 840 for invoking various value-added services 106. However, not all value-added services may be provided by a services platform, and different value-added services may be provided by different services platforms. These services platforms may be at different geographic locations, and accordingly invoking different value-added services through the single DSA platform 840 may have limitations due to communication path delays between the DSA platform 840 and the different services platforms. Additionally, in certain cases, when the requestor is located in a country which restricts exporting of certain personal data of users, transmitting request message received from the requestor at the DSA platform 840 to invoke various value-added services may risk violation of the country's data privacy laws. Additionally, or alternatively, not all data elements included in, or received with, the request message from the requestor may be required by the value-added service, and, accordingly, transmitting only the required data elements according to the service contact between the requestor and the value-added service provider may improve network bandwidth usage while securing data exchange between the requestor and the value-added service provider. Additionally, or alternatively, as described herein, a single transaction may require responses from more than one value-added service, and not all value-added services require all data from the received request message. Accordingly, the orchestration framework (Bridge App) is a scalable system that is configured to invoke multiple, different value-added services for a single transaction dynamically and is configured to provide only relevant and required data elements and their values to the value-added services platform adhering to data privacy requirements for the data within the country in which the requestor is located.

FIG. 9 illustrates an example direct service access ("DSA") API gateway service handler framework 900. DSA API gateway framework 900 may be integrated into network services bridge computing system 800 that includes the DSA framework 840 and API gateway 845 as shown in FIG. 8.

DSA API gateway framework 900 is configured to read an API message payload and forward the message payload to a Bridge App 902. Bridge App 902 is part of an orchestration layer 903, where Bridge App 902 is configured to read and extract individual data elements from the message payload for identifying a nature of the transaction. Based upon the identified nature of the transaction, orchestration layer 903 is configured to determine how many and which value-added services (VAS) need to be performed for the particular transaction. Additionally, or alternatively, Bridge App 902 is configured to determine which data elements are permissioned for each VAS service by performing a lookup within the service contract rules or service agreement rules (902*a*) for the corresponding VAS service and a respective service provider of the VAS service, and parse the message payload so that the permissioned data elements are segregated from the other data, and then provide the permissioned data elements to the corresponding value-added services. Orchestration layer 903 is configured to create temporary service execution layers corresponding to the number of value-added services required to be invoked for processing the transaction message. The service execution layers are created temporarily by orchestration layer 903 using cloud computing resources, and therefore, the service execution layers may be quickly created on an as-needed basis and deleted when no longer required which provides a more efficient use of computer resources when processing these transaction messages and executing the VAS for the transaction. Orchestration layer 903 is configured to push, or provision all required configuration files (e.g., endpoint configuration) and business rules (e.g., a list of the permissioned data elements required by a value-added service) to communicate with the respective value-added services platform of the corresponding service execution layer. Each value-added services platform then provides a response based on the received service request at the value-added services platform including data fields required to provide the necessary response.

By using the orchestration layer 903 to create each service execution layer with the corresponding configuration file, endpoint configuration, and corresponding business rules (e.g., a list of the permissioned data elements required by a value-added service), the system is better able to control the data being sent to the different VASs. Specifically, the system is better able to control the type of data being sent and where it is being sent. As a result, data security is improved and rules relating to controlling geolocation of data transmissions and/or a list of required data elements by a value-added service are followed. Thus, data privacy laws of the country in which the requestor is located may be honored by using this system for controlling where certain data is being sent. Upon receiving responses from all the VAS platforms at their respective service execution layers, service execution layers may forward the received responses to orchestration layer 903 for generating a service response (e.g., re-translating the received data back to the home network's processing format) including combining individual responses received from each service execution layers into a single message response transmitted back to the Bridge App 902 and on to the home network.

As shown in FIG. 9, service orchestrator 903 or Bridge App 902 may include a memory or a datastore to store service configurations and/or business rules related to a plurality of value-added services platforms 906*a*, 906*b*, and 906*n*. The business rules include the service contract rules indicating the data elements that are permissioned to be provided to the VAS service, and may include information describing the required data elements of the VAS and/or default values for one or more required data elements of the VAS in case a required data element is not included in the request message. The service contract may thus define an interface between the value-added service platform and the requestor's network. By way of a non-limiting example, the service contract may be a web services description language (WSDL), and/or template uniform resource identifiers (URIs) with endpoints and schemas of data elements, etc. The plurality of value-added services platforms 906*a*, 906*b*, and 906*n* may correspond with, for example, services 162, 164, 166, and 168 described hereinabove. The service configurations may correspond with endpoint configurations for one or more endpoints of the value-added services platforms 906*a*, 906*b*, and 906*n* to communicate with the value-added services platforms 906*a*, 906*b*, and 906*n*. Similarly, business rules may provide business logic, triggering rules for invoking one or more value-added services based on the received service request from API handler 910.

API handler 910 may receive a service request webservice API message from a plurality of requestors' endpoints. The requestors may be any of the home network processor 112, issuer 120, acquirer 125, merchant 130, a payment aggregator, a payment gateway, a government, a financial technology ("Fintech") system, or an account clearing house ("ACH") system, as described herein. The endpoints may include an endpoint 916*a*, an endpoint 916*b*, and/or an endpoint 916*c*, which may communicate with API handler 910 to send a webservice API request message and receive a webservice API response message in return. In some embodiments, the webservice request message and the webservice response message may require the payload to be encrypted and/or compressed. The API handler 910 may utilize payload encryption module 912 and payload compression module 914 for encryption of payload data and compression of payload data, respectively.

Upon receiving a webservice API request message from an endpoint of a requestor 916*a*, 916*b*, or 916*c*, API handler 910 may encrypt and/or compress the payload data of the webservice API request message and forward the webservice API request message to the Bridge App 902. Bridge App 902 may decrypt and/or decompress the payload data to identify a nature of the transaction and key data elements included therein. Based on the identified nature of the transaction and the key data elements, the Bridge App 902 may determine which value-added services and their respective subset of permissioned data elements that are required for the received webservice API request message. The Bridge App 902 may determine the permissioned data elements to provide for each of the particular VASs by performing a lookup in memory for the service contract rules at 902*a*. The Bridge App 902 may accordingly temporarily create service execution layers using cloud computing resources. By way of a non-limiting example, Bridge App 902 may determine that for the received webservice API request message, n value-added services are required, where n>=1. Bridge App 902 may create n service execution layers 904*a*, 904*b*, and 904*n*. Each service execution layer of the n service execution layers 904*a*, 904*b*, and 904*n* communicates with the respective value-added service platform 906*a*, 906*b*, and 906*n* of the value-added service based on service endpoint configuration (e.g., 904*a*3, 904*b*3, and 904*n*3) and business rules (e.g., 904*a*2, 904*b*2, and 904*n*2) provisioned by Bridge App 902. As described herein, the business rules may include a mapping of the subset of permissioned data elements corresponding to the value-added service so that the VAS service is able to determine the data elements being provided. Each service execution layer of the n service execution layers 904*a*, 904*b*, and 904*n* may include a module (e.g., 904*a*1, 904*b*1, and 904*n*1) to decode the received webservice request message and encode a webservice response message. Since each service execution layer may receive responses from the value-added service platforms 906*a*, 906*b*, and 906*n* asynchronously, Bridge App 902 may hold received responses from the service execution layers in memory until all pending responses are received from the service execution layers, and a webservice response message is generated and transmitted to the API handler 910 based on combining all responses from the service execution layers. The Bridge App 902 then releases or frees the cloud computing resources related to the service execution layers 904*a*, 904*b*, and 904*n*.

Additionally, or alternatively, Bridge App 902 may include, or may be communicatively coupled with, a post processing module 908 including a byte logger 908*a* configured to log incoming and/or outgoing webservice API messages, a logger 908*b* configured to log internal and/or external events for debugging or other similar purposes, and a billing feeder 908*c* configured to trigger or generate billing events.

Figure 10:
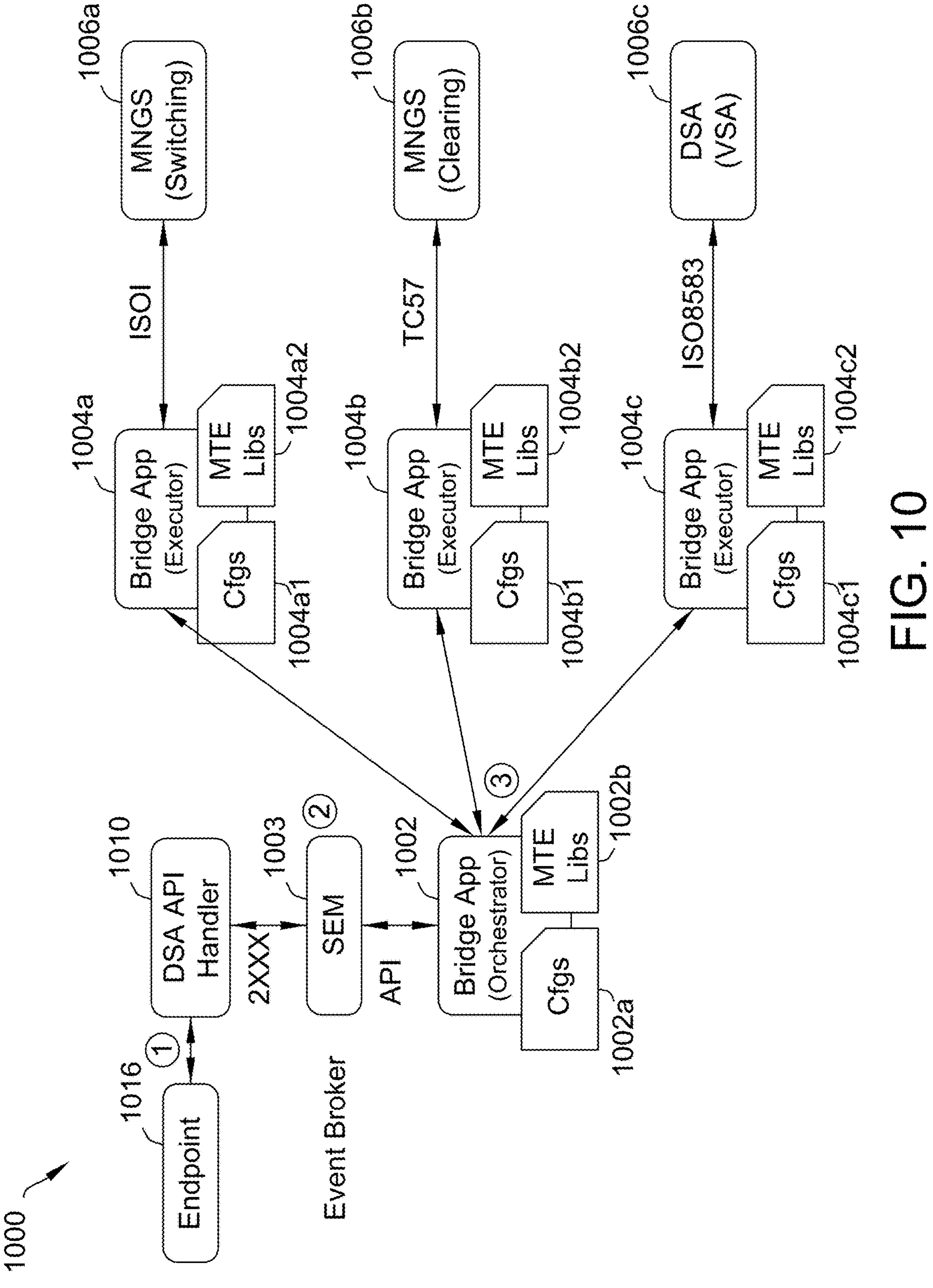
FIG. 10 illustrates an example network of the service handler framework (or Bridge App) in communication with certain example value-added services including onboard switching and clearing application programing interfaces as shown in FIG. 9.

FIG. 10 illustrates an example network 1000 of service framework or Bridge App 1002 in communication with example value-added services 1006*a*, 1006*b*, and 1006*c* including onboard switching 1006*a* and clearing application 1006*b* programing interfaces. As shown in the example network 1000, an endpoint 1016 (such as the endpoint 916*a*, 916*b*, or 916*c*), a DSA API handler 1010 (such as the API handler 910), Bridge App 1002 (such as the Bridge App 902) may be communicatively coupled with each other and communicate with each other using API messages (such as webservices API message for XML-RPC, UDDI, SOAP, REST, GraphQL, etc.) Service execution layers 904*a*, 904*b*, and 904*n* from FIG. 9 are shown in FIG. 10 as 1004*a*, 1004*b*, and 1004*c*, respectively, and value-added services platforms 906*a*, 906*b*, and 906*n* are shown in FIG. 10 as 1006*a*, 1006*b*, and 1006*c*, respectively. Based upon the endpoint configuration 1004*a*1, 1004*b*1, and 1004*cl* provisioned at, or pushed to, each service execution layer of service execution layers 1004*a*, 1004*b*, and 1004*c*, each service execution layer communicates with an endpoint of the respective value-added services platform using an appropriate API message format and permissioned data elements according to a service contact for providing the respective value-added service by the value-added services platform.

By way of a non-limiting example, service execution layer 1004*a* may communicate with endpoint 1006*a* for a value-added service of message switching (referenced herein as Mastercard network gateway service (MNGS) switching) using an ISOI API message format. The service execution layer 1004*b* may communicate with the endpoint 1006*b* for a value-added service of message clearing (referenced herein as MNGS clearing) using a TC57 API message format, and the service execution layer 1004*c* may communicate with the endpoint 1006*c* for a DSA value-added service (referenced herein as DSA VAS) using ISO8583 API message format. Since the communication between each service execution layer and Bridge App 1002 is based on a webservice API message format, e.g., in JavaScript Object Notation (JSON), each service execution layer may format the received JSON format message into the respective API message format such as ISOI, TC57, or ISO8583 API message format, and vice versa, using library modules 1004*a*2, 1004*b*2, and 1004*c*2, respectively. The Bridge App 1002 may also include library modules 1002*b* for processing of the API request messages received at the Bridge App 1002 and to create and release service execution layers, as required, and to communicate with the created service execution layers.

Additionally, or alternatively, DSA API handler 1010 may communicate with the Bridge App 1002 via an event broker 1003, which may pass on (or transmit or forward) the received API payload from the requestor endpoint 1016 at the DSA API handler 1010 to the Bridge App 1002 (or another Bridge App (not shown)) based on the API payload. By way of a non-limiting example, the endpoint configurations 1004*a*1, 1004*b*1, and 1004*cl* provisioned at, or pushed to, each service execution layer of service execution layers 1004*a*, 1004*b*, and 1004*c*, may be stored at the Bridge App 1002 in a memory or a datastore (or a database).

Figure 11:
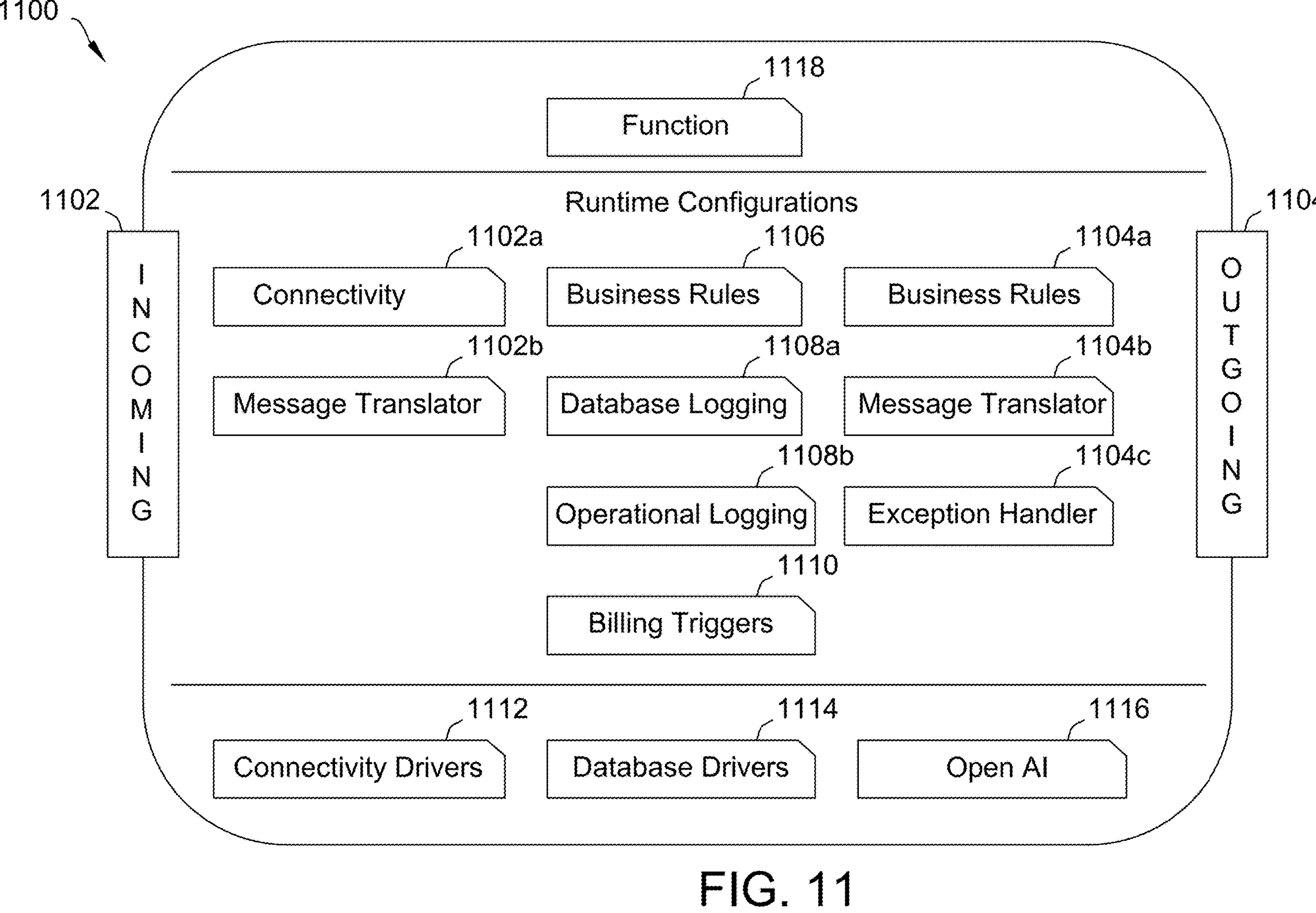
FIG. 11 illustrates example modules of the Bridge App shown in FIG. 10.

FIG. 11 illustrates an example block diagram 1100 of function modules of Bridge App 902 or 1002. Various function modules of Bridge App 902 or 1002 may include, but are not limited to, a connectivity module 1102*a* and a message translator module 1102*b* for connecting with incoming connection endpoint 1102 and receiving API request message from the DSA API handler 910 (or 1010) or from the event broker 1003. The connectivity module 1102*a* may maintain connectivity with the DSA API handler 910 (or 1010) or from the event broker 1003, and the message translator module 1102*b* may decode the received API request message into a local message structure for the Bridge API 902.

A Bridge API function module 1118 may then process local message structure in accordance with business rules 1106 and may generate an API message using a message translator module 1104*b* via an outgoing connection endpoint 1104. A connectivity module 1104*a* may maintain connectivity with a temporarily created service execution layer. An exception handler 1104*c* may handle exceptions or errors that occur while generating the API message using the message translator module 1104*b* or any other processing at the Bridge App 902 or 1002. The Bridge App 902 or 1002 may also include a database logging module 1108*a* and/or an operational logging module 1108*b* for logging of various events, messages, etc., for debugging or other similar purposes. The Bridge App 902 or 1002 may include connectivity drivers 1112 and/or database drivers 1114 for connecting with incoming and outgoing connection endpoints 1102 and 1104, and a database storing business rules and other configurations, etc.

The Bridge App 902 or 1002 may include an artificial intelligence (AI) listener module 1116. The AI listener module 1116 may monitor API messages received at the incoming and outgoing connection endpoints 1102 and 1104 and relationship between the messages, what information being requested and how corresponding response message is formed. Accordingly, in cases, when the service execution layer may not be created due to non-availability of cloud computing resources, and/or when the value-added service platform is unavailable, etc., the AI listener module 1116 may generate a response based on historical monitoring of a plurality of requests and a plurality of responses analyzed by the AI listener module 1116.

Figure 12:
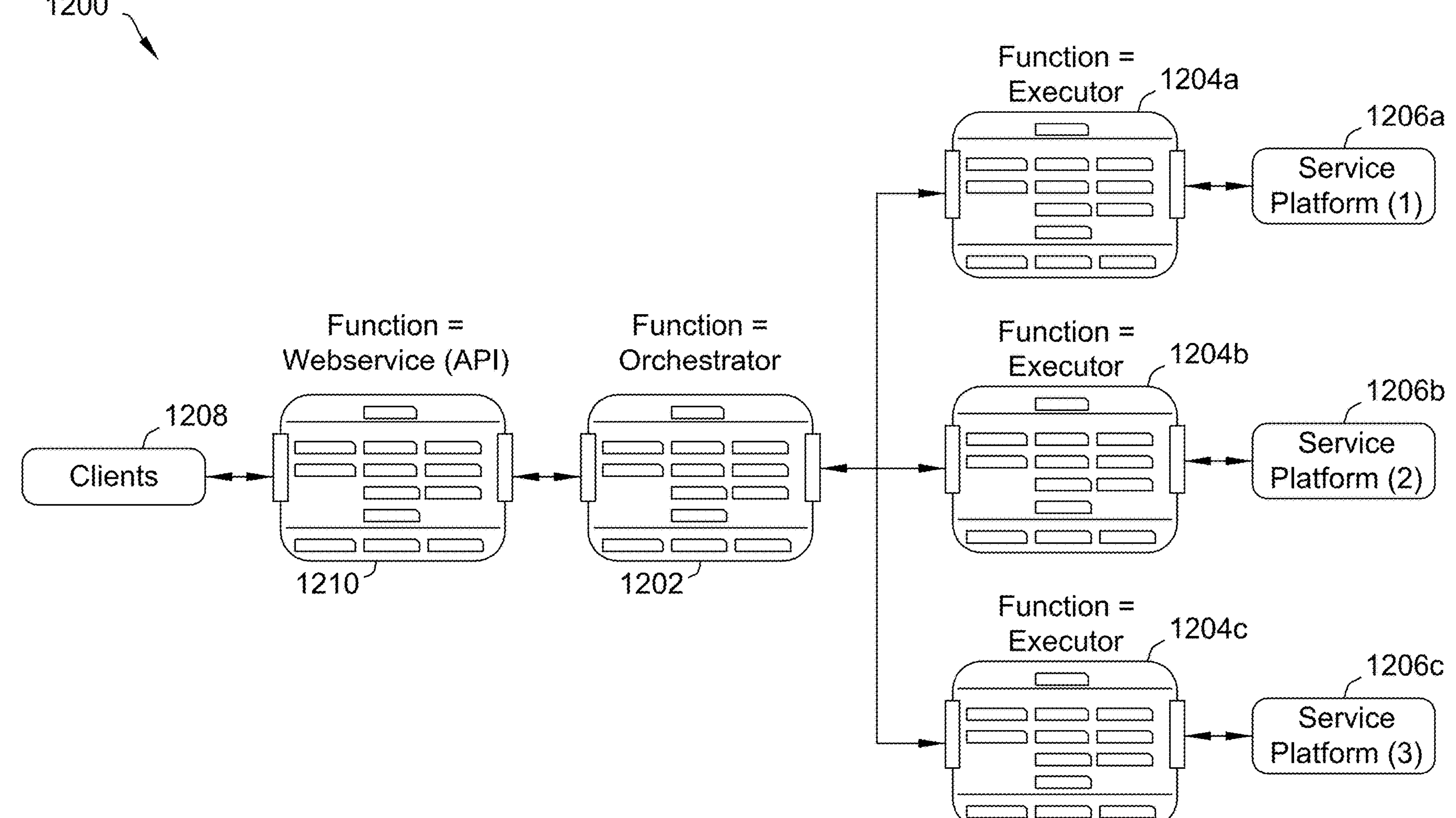
FIG. 12 illustrates an example webservice for invoking a plurality of value-added services using the service handler framework shown in FIG. 10.

FIG. 12 illustrates a diagram 1200 for invoking a plurality of value-added services, such as 1206*a*, 1206*b*, and/or 1206*c*, via a single API connection between the Bridge App 1202 and a DSA API handler 1210. As shown herein, based upon a webservice API request message received at the DSA API handler 1210 from clients (or requestors) 1208, the Bridge App 1202 may determine three different value-added services 1206*a*, 1206*b*, and 1206*c* are required to be invoked. In some examples, these value-added services 1206*a*, 1206*b*, and 1206*c* may be required simultaneously (or near-simultaneously) or sequentially, for example, information received from one value-added service 1206*a* may be used to request information from another value-added service 1206*b* or 1206*c*. The Bridge App 1202 may accordingly temporarily create three service execution layers 1204*a*, 1204*b*, and 1204*c*. Each of the service execution layers 1204*a*, 1204*b*, and 1204*c* and/or the DSA API handler 1210 may include function modules as shown in FIG. 11.

In the example embodiment, the Bridge App 1202 is configured to determine which VASs are required for a particular incoming message, and after performing a lookup within the service contract for that particular message, determining that data elements included in the message are to be shared with each of the services. Thus, each service is only provided those permissioned data elements that are approved by the registered party to perform the service. By so doing, computational resources are conserved, the processing of the data is made more efficient, and the data is better secured.

Figure 13:
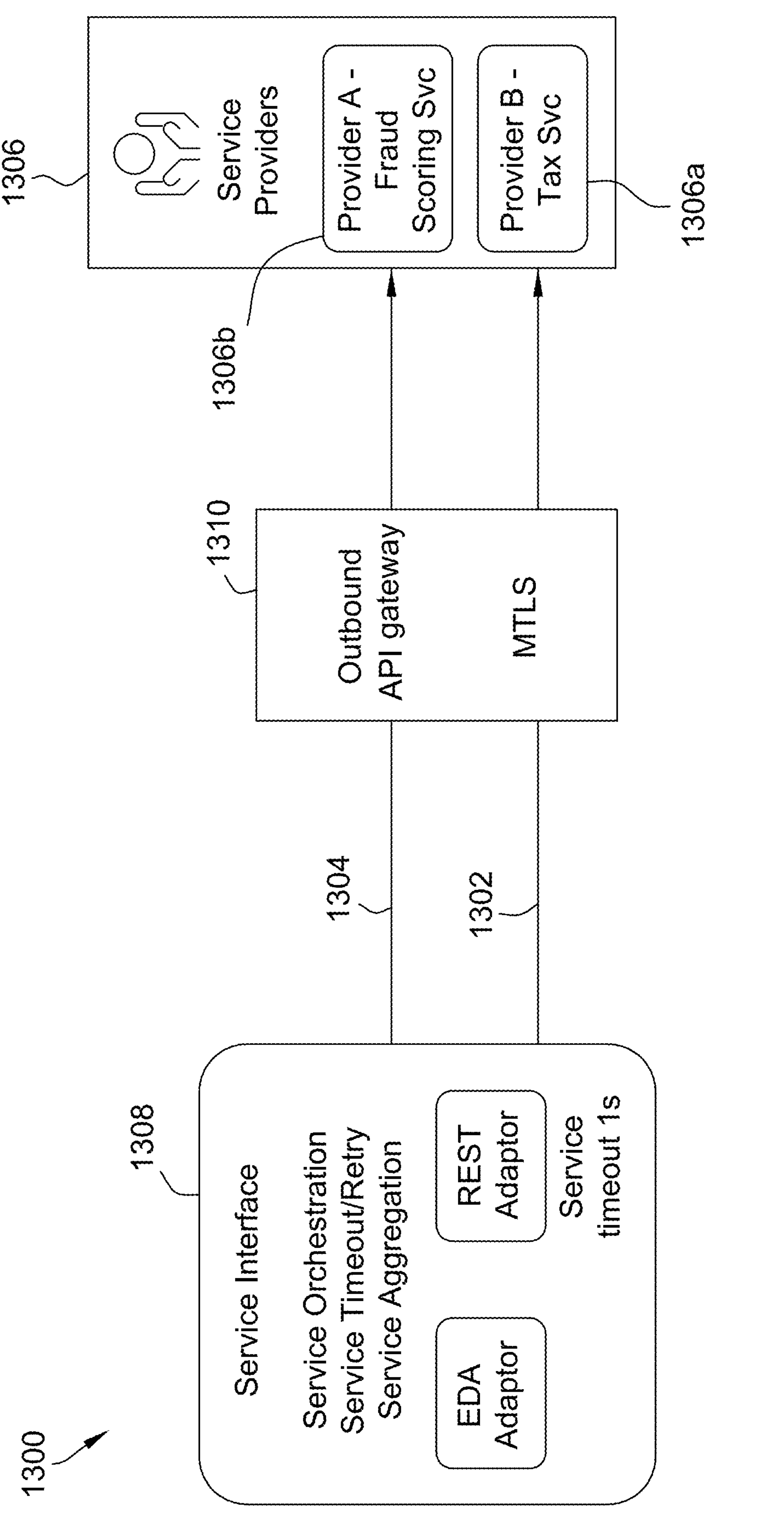
FIG. 13 illustrates an example diagram for providing two different services by a first service provider and a second service provider of a plurality of service providers, respectively.

FIG. 13 illustrates a diagram 1300 for providing two different services, for example, a tax calculation service 1302 and a fraud detection service 1304 provided by a first service provider 1306*a* and a second service provider 1306*b* of a plurality of service providers 1306, respectively. Because the data elements required for the tax calculation service 1302 may be different from the data elements required for the fraud detection service 1304, a service contract for providing the tax calculation service 1302 may include a list of data elements that may be different from a list of data elements included in a service contract for providing the fraud detection service 1304. The Bridge App 1308 (also labeled service interface and service orchestration) may accordingly create different API messages for invoking the fraud detection service 1304 and the tax calculation service 1302. The API message transmitted to a service execution layer 1310 (also labeled API gateway) for invoking the fraud detection service 1304 may include a list of data elements according to the service contract for providing the fraud detection service by the second service provider 1306*b*, and the API message transmitted to the service execution layer 1310 for invoking the tax calculation service 1302 may include a list of data elements according to the service contract for providing the tax calculation service by the first service provider 1306*a*. In FIG. 13, a single service execution layer 1310 is shown being connected to the first service provider and the second service provider, different service execution layers may be connected to the first service provider and the second service provider.

Figure 14:
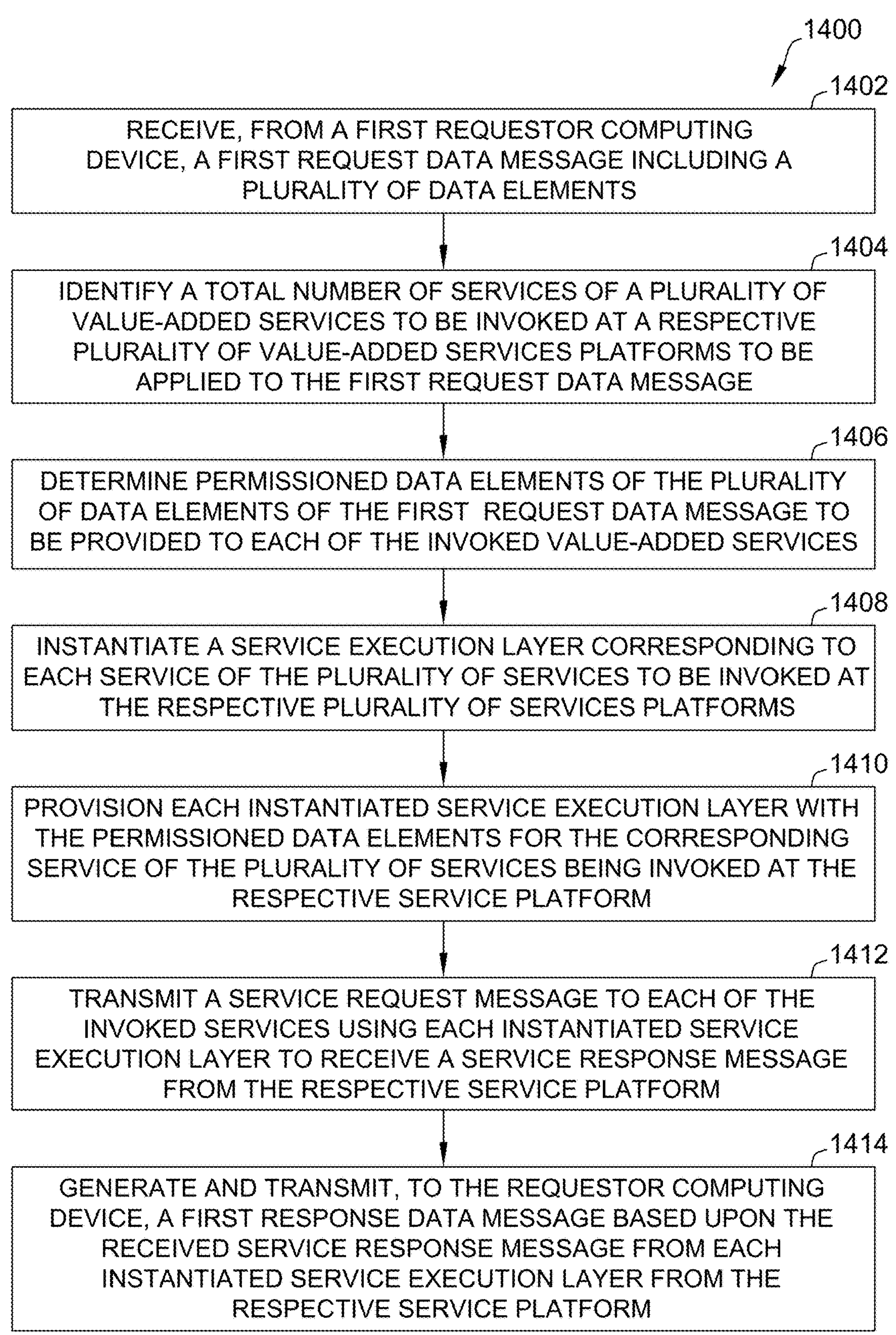
FIG. 14 is a flow diagram of an example method of operations performed by a scalable orchestration framework for value-added services, such as direct service access ("DSA") API gateway service handler framework shown in FIG. 9.

FIG. 14 is a flow diagram 1400 of an example method of operations performed by a scalable orchestration framework for accessing a plurality of value-added services at a plurality of services platforms. The scalable orchestration framework may include a DSA API gateway service handler (or Bridge App) shown in FIG. 9. The Bridge App may receive 1402 a first request data message from a requestor computing device. The first request data message may include a plurality of data elements. By way of a non-limiting example, the first request data message may be associated with a first authorization process, which may be a value-added service, as described herein. In response to receiving the first request data message, the Bridge App may identify 1404 a total number of services of the plurality of value-added services to apply to the received first request data message invoking the identified services at a respective plurality of value-added services platforms, as described in detail with respect to FIGS. 9-12.

The Bridge App may determine 1406 permissioned data elements of the plurality of data elements of the first request data message to be provided to each of the invoked value-added services. As described herein the permissioned data elements corresponding to each of the invoked value-added services may be described or included in the service contract rules or service agreement rules (902*a*). The Bridge App may perform a lookup in the service contract rules or service agreement rules to determine the permissioned data elements corresponding to each of the invoked value-added services. Additionally, or alternatively, the Bridge App may also be configured to determine the specific data elements or the types of data elements to be provided to each of the value-added services so that only those data elements that are required to perform the service is provided to that particular service. The Bridge App may be configured to make this determination by performing a lookup within memory of the service contract that contains rules indicating which data elements are required to be shared.

The Bridge App may instantiate 1408 a service execution layer corresponding to each service of the plurality of services to be invoked at the respective plurality of services platforms. As described herein, each service execution layer is instantiated dynamically and temporarily using cloud computing resources, and each instantiated service execution layer is provisioned 1410 with business rules and endpoint configuration file corresponding to a service of the plurality of services being invoked at the respective service platform. The business rules may provide a list of permissioned data elements required for providing a service of the plurality of services. The endpoint configuration file may include configurations for establishing communication or sessions between the instantiated service execution layer and an endpoint of the value-added services platform. The business rules provisioned at each generated or instantiated service execution layer may further include information related to personal data privacy of a country in which the requestor computing device is located.

The Bridge App may transmit 1412 a service request message to each of the invoked services using each instantiated 1408 service execution layer to receive a service response message the respective service platform. By way of a non-limiting example, the service request message may be transmitted as an application programming interface (API). The API message may be a webservice API message, for example, in JSON format. The service execution layer may format the received API message into a format supported by the value-added services platform, as described herein using FIG. 10, and may receive recommendation from the value-added services platform via the instantiated service execution layer.

The Bridge App may generate and transmit 1414, to the requestor computing device, a first response data message. The first response data message may be generated based upon the received service response message from each instantiated service execution layer from the respective service platform. The Bridge App may store one or more responses from one or more instantiated service execution layers until the service response message is received from each instantiated service execution layer. Upon transmitting the first response data message, the Bridge App may release cloud computing resources associated with the each instantiated service execution layer corresponding to each invoked service of the plurality of services at the respective plurality of services platforms.

In some embodiments, the Bridge App may monitor a plurality of first request data messages and a plurality of first response data messages and identify a context of each pair of the first request data message and the first response data message and store in the memory. A response data message may be generated based at least in part on the context of stored pairs of the first request data message and the first response data message when a value-added service platform of the plurality of service platforms is unavailable. Additionally, or alternatively, a response data message may be generated based at least in part on the context of stored pairs of the first request data message and the first response data message when a service execution layer cannot be instantiated.

This written description uses examples to illustrate the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A scalable orchestration framework comprising an orchestrator platform, the orchestrator platform comprising at least one memory, and at least one processor in communication with the at least one memory, the at least one memory storing instructions executable by the at least one processor, causing the at least one processor to:

receive, from a requestor computing device, a first request data message including a plurality of data elements, wherein the first request data message is associated with a first authorization process;

in response to receiving the first request data message, identify a total number of services of a plurality of value-added services to be invoked at a respective plurality of value-added services platforms to be applied to the first request data message;

determine permissioned data elements of the plurality of data elements of the first request data message to be provided to each of the invoked value-added services, wherein the permissioned data elements are associated with business rules and include information related to personal data privacy of a country in which the requestor computing device is located;

instantiate a service execution layer corresponding to each service of the plurality of value-added services to be invoked at the respective plurality of value-added services platforms, wherein each service execution layer is dynamically instantiated and configured to be active for a respective temporary duration for each of the plurality of value-added services platforms for the associated first authorization process;

provision each instantiated service execution layer with the permissioned data elements including the business rules for the corresponding service of the plurality of value-added services being invoked at the respective value-added services platform;

transmit a service request message to each of the invoked value-added services using each instantiated service execution layer to receive a service response message from the respective value-added services platform;

generate and transmit, to the requestor computing device, a first response data message based upon the received service response message from each instantiated service execution layer from the respective value-added services platform; and delete each instantiated service execution layer after each respective temporary duration has ended.

2. The scalable orchestration framework according to claim 1, wherein the instructions further cause the at least one processor to release cloud computing resources associated with the instantiated service execution layer corresponding to each service of the plurality of invoked value-added services at the respective plurality of value-added services platforms upon transmitting the first response data message to the requestor computing device.

3. The scalable orchestration framework according to claim 1, wherein the instructions further cause the at least one processor to store one or more responses from one or more instantiated service execution layers from one or more service platforms until the response from each instantiated service execution layer is received.

4. The scalable orchestration framework according to claim 1, wherein the instructions further cause the at least one processor to:

monitor a plurality of first request data messages and a plurality of first response data messages; and identify a context of each pair of a plurality of pairs of the plurality of first request data messages and the plurality of first response data messages and store context data corresponding to the identified context in the at least one memory.

5. The scalable orchestration framework according to claim 4, wherein the instructions further cause the at least one processor to, based at least in part on the context data stored in the at least one memory, generate a response data message for a request data message when a value-added services platform of the respective plurality of value-added services platforms is unavailable.

6. The scalable orchestration framework according to claim 4, wherein the instructions further cause the at least one processor to, based at least in part on the context data stored in the at least one memory, generate a response data message for a request data message when the service execution layer cannot be instantiated.

7. A computer-implemented method performed at a scalable orchestration framework comprising at least one memory and at least one processor in communication with the at least one memory, the computer-implemented method comprising:

receiving, from a requestor computing device at the at least one processor, a first request data message including a plurality of data elements, wherein the first request data message is associated with a first authorization process;

in response to receiving the first request data message, identifying, by the at least one processor, a total number of services of a plurality of value-added services to be invoked at a respective plurality of value-added services platforms to be applied to the first request data message;

determining, by the at least one processor, permissioned data elements of the plurality of data elements of the first request data message to be provided to each of the invoked value-added services, wherein the permissioned data elements are associated with business rules and include information related to personal data privacy of a country in which the requestor computing device is located;

instantiating, by the at least one processor, a service execution layer corresponding to each value-added service of the plurality of value-added services to be invoked at the respective plurality of value-added services platforms, wherein each service execution layer is dynamically instantiated and configured to be active for a respective temporary duration for each of the plurality of value-added services platforms for the associated first authorization process;

provisioning, by the at least one processor, each instantiated service execution layer with the permissioned data elements including the business rules for the corresponding value-added service of the plurality of value-added services being invoked at the respective value-added services platform;

transmitting, by the at least one processor, a service request message to each of the invoked value-added services using each instantiated service execution layer to receive a service response message from the respective value-added services platform;

generating and transmitting, by the at least processor, to the requestor computing device, a first response data message based upon the received service response message from each instantiated service execution layer from the respective value-added services platform; and deleting each instantiated service execution layer after each respective temporary duration has ended.

8. The computer-implemented method according to claim 7, further comprising releasing cloud computing resources associated with the instantiated service execution layer corresponding to each value-added service of the plurality of invoked value-added services at the respective plurality of value-added services platforms upon transmitting the first response data message to the requestor computing device.

9. The computer-implemented method according to claim 7, further comprising storing one or more responses from one or more instantiated service execution layers from one or more service platforms until the response from each instantiated service execution layer is received.

10. The computer-implemented method according to claim 7, further comprising:

monitoring a plurality of first request data messages and a plurality of first response data messages; and identifying a context of each pair of a plurality of pairs of the plurality of first request data messages and the plurality of first response data messages and store context data corresponding to the identified context in the at least one memory.

11. The computer-implemented method according to claim 10, further comprising, based at least in part on the context data stored in the at least one memory, generating a response data message for a request data message when a value-added service platform of the respective plurality of value-added services platforms is unavailable.

12. The computer-implemented method according to claim 10, further comprising, based at least in part on the context data stored in the at least one memory, generating a response data message for a request data message when the service execution layer cannot be generated or instantiated.

13. A non-transitory computer-readable medium (CRM) embodying programmed instructions which, when executed by at least one processor of an orchestration platform, cause the at least one processor to:

receive, from a requestor computing device, a first request data message including a plurality of data elements, wherein the first request data message is associated with a first authorization process;

in response to receiving the first request data message, identify a total number of services of a plurality of value-added services to be invoked at a respective plurality of value-added services platforms to be applied to the first request data message;

determine permissioned data elements of the plurality of data elements of the first request data message to be provided to each of the invoked value-added services, wherein the permissioned data elements are associated with business rules and include information related to personal data privacy of a country in which the requestor computing device is located;

instantiate a service execution layer corresponding to each value-added service of the plurality of value-added services to be invoked at the respective plurality of value-added services platforms, wherein each service execution layer is dynamically instantiated and configured to be active for a respective temporary duration for each of the plurality of value-added services platforms for the associated first authorization process;

provision each instantiated service execution layer with the permissioned data elements including the business rules for the corresponding value-added service of the plurality of value-added services being invoked at the respective value-added services platform;

transmit a service request message to each of the invoked value-added services using each instantiated service execution layer to receive a service response message from the respective value-added services platform;

generate and transmit, to the requestor computing device, a first response data message based upon the received service response message from each instantiated service execution layer from the respective value-added services platform; and delete each instantiated service execution layer after each respective temporary duration has ended.

14. The non-transitory CRM according to claim 13, wherein the permissioned data elements are associated with business rules and wherein:

the instructions further cause the at least one processor to release cloud computing resources associated with the instantiated service execution layer corresponding to each value-added service of the plurality of invoked value-added services at the respective plurality of value-added services platforms upon transmitting the first response data message to the requestor computing device; or the business rules are provisioned at each instantiated service execution layer further and include information related to personal data privacy of a country in which the requestor computing device is located.

15. The non-transitory CRM according to claim 13, wherein the instructions further cause the at least one processor to:

monitor a plurality of first request data messages and a plurality of first response data messages; and identify a context of each pair of a plurality of pairs of the first request data messages and the first response data messages and store context data corresponding to the identified context in at least one memory.

16. The non-transitory CRM according to claim 15, wherein the instructions further cause the at least one processor to:

based at least in part on the context data stored in the at least one memory, generate (i) a response data message for a request data message when a value-added services platform of the respective plurality of value-added services platforms is unavailable; or (ii) the response data message for the request data message when the service execution layer cannot be instantiated.

* * * * *